United States Patent
Singh et al.

(10) Patent No.: US 9,717,064 B2
(45) Date of Patent: Jul. 25, 2017

(54) METHODS AND APPARATUS FOR ADVERTISING RESTRICTED ACCESS IN WIRELESS NETWORKS

(75) Inventors: Damanjit Singh, San Diego, CA (US); Jen Mei Chen, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 550 days.

(21) Appl. No.: 13/550,457

(22) Filed: Jul. 16, 2012

(65) Prior Publication Data

US 2014/0016529 A1   Jan. 16, 2014

(51) Int. Cl.
*H04W 12/08*   (2009.01)
*H04W 48/02*   (2009.01)
(Continued)

(52) U.S. Cl.
CPC ........... *H04W 60/00* (2013.01); *H04W 12/08* (2013.01); *H04W 48/02* (2013.01); *H04W 84/045* (2013.01); *Y02B 60/50* (2013.01)

(58) Field of Classification Search
CPC ... H04W 60/00; H04W 12/08; H04W 84/045; H04W 4/08; H04W 48/02; H04W 48/08
(Continued)

(56) References Cited

U.S. PATENT DOCUMENTS

2009/0070694 A1*   3/2009   Ore et al. ............ 715/764
2010/0112980 A1    5/2010   Horn et al.
(Continued)

FOREIGN PATENT DOCUMENTS

WO   2010088692 A1   8/2010
WO   2011127224 A1   10/2011
(Continued)

OTHER PUBLICATIONS

Kolding T., et al., "Home Node B and Femtocells" In: "WCDMA for UMTS", Aug. 6, 2010 (Aug. 6, 2010), John Wiley & Sons, Ltd, Chichester, UK, XP055093193, ISBN: 978-0-47-068646-1 pp. 515-546, DOI: 10.1002/9780470669501. ch19, paragraph [19.4.1], paragraph [19.5], paragraph [19.6.1].
(Continued)

*Primary Examiner* — Jeffrey M Rutkowski
*Assistant Examiner* — Fangyan Deng

(57) ABSTRACT

Methods and apparatuses are provided for avoiding membership verification for a non-closed subscriber group (CSG) user equipment (UE) communicating with a femto node advertising restricted access. A femto node or femto gateway can receive configuration information specifying to refrain from performing membership verification for UEs communicating with a femto node. Based on such information, the femto node or femto gateway can communicate registration information for a registration request received from a non-CSG UE without performing membership verification. Additionally or alternatively, femto nodes can register non-CSG UEs as CSG UEs to mitigate membership verification at femto gateways, request that femto gateways refrain from performing membership verification, and/or the like. In this regard, the femto node can use restricted access parameters for purposes other than restricting access.

12 Claims, 18 Drawing Sheets

(51) Int. Cl.
*H04W 84/04* (2009.01)
*H04W 60/00* (2009.01)

(58) Field of Classification Search
USPC .................. 370/312, 395.3; 455/433–436
See application file for complete search history.

(56) References Cited

U.S. PATENT DOCUMENTS

| | | |
|---|---|---|
| 2011/0177814 A1 | 7/2011 | Buchmayer et al. |
| 2011/0201331 A1 | 8/2011 | Jha et al. |
| 2011/0223912 A1 | 9/2011 | Nasielski et al. |
| 2012/0100852 A1* | 4/2012 | Horn .......................... 455/436 |
| 2012/0129483 A1 | 5/2012 | Wang et al. |

FOREIGN PATENT DOCUMENTS

| | | |
|---|---|---|
| WO | WO2011137399 | 11/2011 |
| WO | WO2011159988 A1 | 12/2011 |

OTHER PUBLICATIONS

Partial International Search Report—PCT/US2013/049384—ISA/EPO—Dec. 20, 2013.
NEC: "HNB Access mode in the HNB REGISTER REQUEST message", 3GPP Draft; R3-090917_25.469_HNBAP_CR, 3rd Generation Partnership Project (3GPP), Mobile Competence Centre ; 650, Route Des Lucioles ; F-06921 Sophia-Antipolis Cedex ; France, no. Seoul, Korea; Mar. 18, 2009, Mar. 18, 2009 (Mar. 18, 2009), XP050341285, [retrieved on Mar. 18, 2009].

* cited by examiner

METHODS AND APPARATUS FOR ADVERTISING RESTRICTED ACCESS IN WIRELESS NETWORKS

BACKGROUND

Field

The following description relates generally to wireless network communications, and more particularly to advertising restricted access at low power base stations.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. Such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

In addition, low power base stations can advertise restricted access such to allow closed access only to mobile devices that are members of a corresponding group (e.g., closed subscriber group (CSG)), or to allow hybrid access such that member devices receive improved access over non-member devices. The low power base stations, in this regard, can broadcast a CSG identity for determining association to the low power base station. Upon determining that the low power base station advertises the CSG and allows hybrid access, a CSG-capable mobile device can determine whether it would receive preferential access in the CSG, and can accordingly request access. Where the mobile device is non CSG-capable, membership verification can be performed at the low power base station or a related gateway based on an international mobile subscriber identity of the device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with advertising closed subscriber group (CSG) identifier in a wireless network while avoiding membership verification. For example, low power base stations can advertise CSG identifier to indicate other information regarding the base station, though the base station may not operate in the associated closed or hybrid access mode. In this regard, the base station can forego membership verification for devices accessing the base station, as the membership verification is not needed unless operating in the closed or hybrid access mode. For example, the base station and/or a corresponding gateway can be preconfigured not to perform membership verification for the base station (e.g., via configuration or other network signaling). In another example, the base station can indicate to a corresponding gateway to refrain from performing membership verification for all or certain devices, communicate member device registration requests for non-member devices to the corresponding gateway, and/or the like.

According to an aspect, a method for avoiding membership verification for a non-CSG user equipment (UE) communicating with a femto node advertising CSG identifier is provided. The method includes receiving configuration information specifying to refrain from performing membership verification for UEs communicating with a femto node and obtaining a registration request for a non-CSG UE. The method further includes communicating registration information for the non-CSG UE without performing membership verification based on the configuration information.

In another aspect, an apparatus for avoiding membership verification for a non-CSG UE communicating with a femto node advertising CSG identifier is provided. The apparatus includes at least one processor configured to receive configuration information specifying to refrain from performing membership verification for UEs communicating with a femto node and obtain a registration request for a non-CSG UE. The at least one processor is further configured to communicate registration information for the non-CSG UE without performing membership verification based on the configuration information. The apparatus further includes a memory coupled to the at least one processor.

In yet another aspect, an apparatus for avoiding membership verification for a non-CSG UE communicating with a femto node advertising CSG identifier is provided. The apparatus includes means for obtaining a registration request for a non-CSG UE. The apparatus further includes means for communicating registration information for the non-CSG UE without performing membership verification based on receiving configuration information specifying to refrain from performing membership verification for UEs communicating with a femto node.

Still, in another aspect, a computer-program product for avoiding membership verification for a non-CSG UE communicating with a femto node advertising CSG identifier is provided including a non-transitory computer-readable medium having code for causing at least one computer to receive configuration information specifying to refrain from performing membership verification for UEs communicating with a femto node. The computer-readable medium further includes code for causing the at least one computer to obtain a registration request for a non-CSG UE and code for causing the at least one computer to communicate registration information for the non-CSG UE without performing membership verification based on the configuration information.

Moreover, in an aspect, an apparatus for avoiding membership verification for a non-CSG UE communicating with a femto node advertising CSG identifier is provided that includes a UE registration receiving component for obtaining a registration request for a non-CSG UE and a UE registering component for communicating registration information for the non-CSG UE without performing membership verification based on receiving configuration information specifying to refrain from performing membership verification for UEs communicating with a femto node.

According to an aspect, a method for avoiding membership verification for a non-CSG UE communicating with a femto node advertising CSG identifier is provided. The method includes receiving a registration request for a non-CSG UE and communicating registration information indicating the non-CSG UE as a CSG UE.

In another aspect, an apparatus for avoiding membership verification for a non-CSG UE communicating with a femto node advertising CSG identifier is provided. The apparatus includes at least one processor configured to receive a registration request for a non-CSG UE and communicate registration information indicating the non-CSG UE as a CSG UE. The apparatus further includes a memory coupled to the at least one processor.

In yet another aspect, an apparatus for avoiding membership verification for a non-CSG UE communicating with a femto node advertising CSG identifier is provided. The apparatus includes means for receiving a registration request for a non-CSG UE and means for communicating registration information indicating the non-CSG UE as a CSG UE.

Still, in another aspect, a computer-program product for avoiding membership verification for a non-CSG UE communicating with a femto node advertising CSG identifier is provided including a non-transitory computer-readable medium having code for causing at least one computer to receive a registration request for a non-CSG UE and code for causing the at least one computer to communicate registration information indicating the non-CSG UE as a CSG.

Moreover, in an aspect, an apparatus for avoiding membership verification for a non-CSG UE communicating with a femto node advertising CSG identifier is provided that includes a UE registration receiving component for receiving a registration request for a non-CSG UE and a UE registering component for communicating registration information indicating the non-CSG UE as a CSG UE.

According to an aspect, a method for avoiding membership verification for a non-CSG UE communicating with a femto node advertising CSG identifier is provided. The method includes requesting that a femto gateway refrain from performing membership verification for UE registration requests and receiving a registration request from a non-CSG UE. The method further includes communicating registration information based on the registration request for the non-CSG UE to the femto gateway without performing membership verification for the non-CSG UE.

In another aspect, an apparatus for avoiding membership verification for a non-CSG UE communicating with a femto node advertising CSG identifier is provided. The apparatus includes at least one processor configured to request that a femto gateway refrain from performing membership verification for UE registration requests and receive a registration request from a non-CSG UE. The at least one processor is further configured to communicate registration information based on the registration request for the non-CSG UE to the femto gateway without performing membership verification for the non-CSG UE. The apparatus further includes a memory coupled to the at least one processor.

In yet another aspect, an apparatus for avoiding membership verification for a non-CSG UE communicating with a femto node advertising CSG identifier is provided. The apparatus includes means for requesting that a femto gateway refrain from performing membership verification for UE registration requests and means for receiving a registration request from a non-CSG UE. The apparatus further includes means for communicating registration information based on the registration request for the non-CSG UE to the femto gateway without performing membership verification for the non-CSG UE.

Still, in another aspect, a computer-program product for avoiding membership verification for a non-CSG UE communicating with a femto node advertising CSG identifier is provided including a non-transitory computer-readable medium having code for causing at least one computer to request that a femto gateway refrain from performing membership verification for UE registration requests and code for causing the at least one computer to receive a registration request from a non-CSG UE. The computer-readable medium further includes code for causing the at least one computer to communicate registration information based on the registration request for the non-CSG UE to the femto gateway without performing membership verification for the non-CSG UE.

Moreover, in an aspect, an apparatus for avoiding membership verification for a non-CSG UE communicating with a femto node advertising CSG identifier is provided that includes a membership verification specifying component for requesting that a femto gateway refrain from performing membership verification for UE registration requests and a UE registration receiving component for receiving a registration request from a non-CSG UE. The apparatus further includes a UE registering component for communicating registration information based on the registration request for the non-CSG UE to the femto gateway without performing membership verification for the non-CSG UE.

According to an aspect, a method for avoiding membership verification for a UE is provided. The method includes broadcasting a CSG identifier, receiving a registration message from a UE, and communicating a registration request for the UE to a core network component or a femto node gateway indicating open access mode operation.

In another aspect, an apparatus for avoiding membership verification for a UE is provided. The apparatus includes at least one processor configured to broadcast a CSG identifier, receive a registration message from a UE, and communicate a registration request for the UE to a core network component or a femto node gateway indicating open access mode operation. The apparatus further includes a memory coupled to the at least one processor.

In yet another aspect, an apparatus for avoiding membership verification for a UE is provided. The apparatus includes means for broadcasting a CSG identifier, means for receiving a registration message from a UE, and means for communicating a registration request for the UE to a core network component or a femto node gateway indicating open access mode operation.

Still, in another aspect, a computer-program product for avoiding membership verification for a UE is provided including a non-transitory computer-readable medium having code for causing at least one computer to broadcast a CSG identifier, code for causing the at least one computer to receive a registration message from a UE, and code for causing the at least one computer to communicate a registration request for the UE to a core network component or a femto node gateway indicating open access mode operation.

Moreover, in an aspect, an apparatus for avoiding membership verification for a UE is provided that includes a CSG advertising component for broadcasting a CSG identifier, a UE registration receiving component for receiving a registration message from a UE, and a UE registering component for communicating a registration request for the UE to a core network component or a femto node gateway indicating open access mode operation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
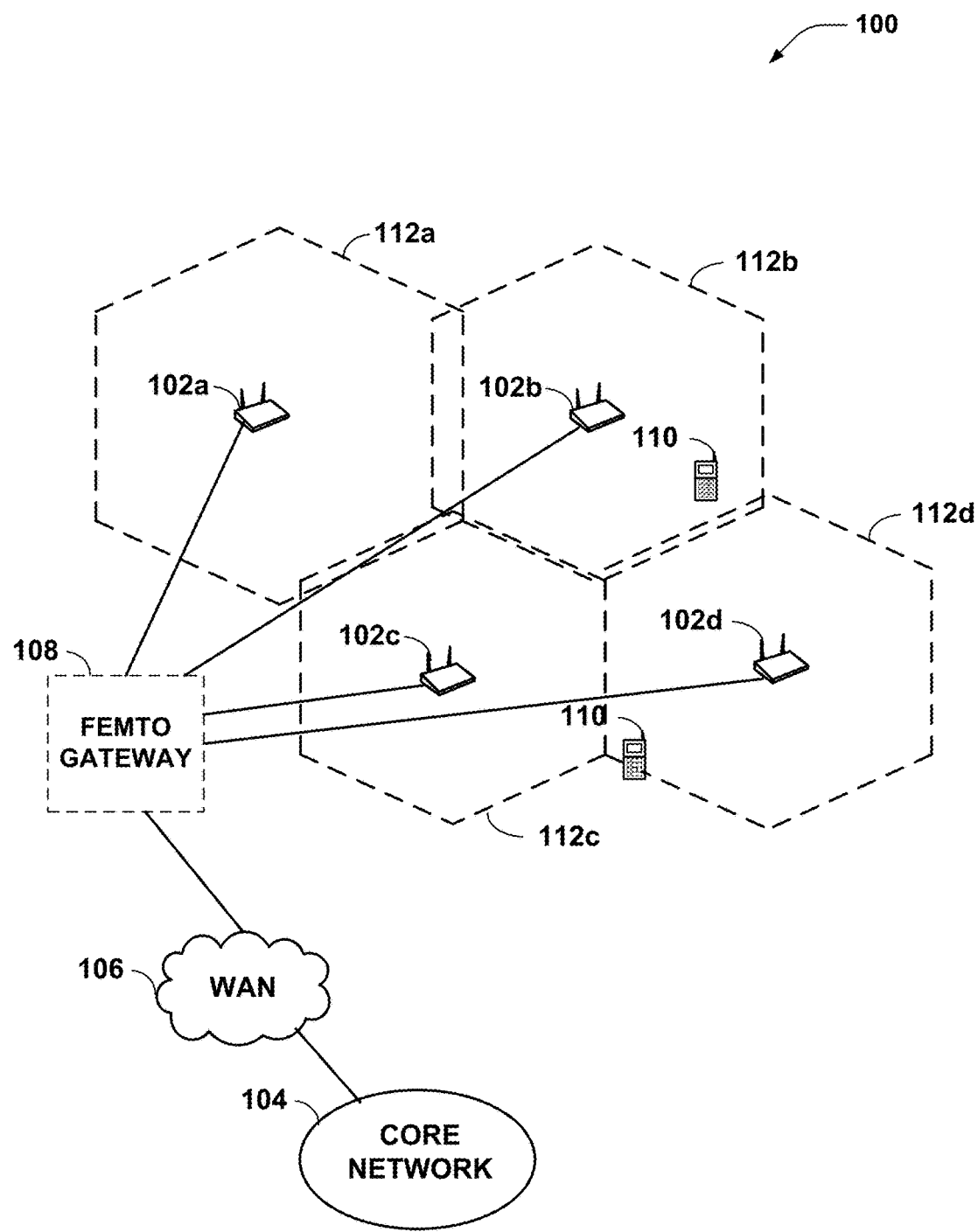
FIG. 1 is a block diagram of an example wireless communication system for employing a plurality of femto nodes.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a low power base station, such as a femto node, can broadcast closed subscriber group (CSG) identifiers to indicate information about the femto node, while operating in an open access mode despite using the CSG identifier. In this regard, the femto node can avoid performing membership verification itself and/or having other nodes perform membership verification for user equipment (UE) accessing the femto node, as such may not be needed when operating in the open access mode. For example, the femto node and/or a related femto gateway can be preconfigured to not perform membership verification for access requests received at the femto node. This configuration can be per UE or for all UEs.

In another example, the femto node can instruct the femto gateway, explicitly or implicitly, to refrain from performing membership verification for a given UE where the UE does not support CSG functionality. An example of implicitly instructing the femto gateway to refrain from performing membership verification can include registering such UEs with the femto gateway as UEs that do support CSG functionality, which can cause the femto gateway to forego membership verification in view of access control or membership verification performed by other nodes in the core network. In any case, unnecessary membership verification of UEs can be avoided at the femto node and/or femto gateway where the femto node is using CSG identifiers for purposes other than providing restricted or hybrid access.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a macro base station associated with a wireless wide area network (WWAN). As such, the coverage area of the low power base station can be substantially smaller than the coverage area of a macro base station. Moreover, for example, low power base stations can be deployed in user homes, offices, other venues, utility polls, public transit, and/or substantially any area to serve a number of devices. For example, a given low power base station may use a smaller scale antenna array that may be attached to a housing for the base station or to a common mounting platform.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an exemplary autonomously controlled wireless communications system 100 including a plurality of femto nodes 102a-d, or other low power base stations, in communication with an operator core network 104 via a WAN 106. As described, femto nodes 102a-d may comprise relatively low power equipment and may not be provided with a conventional transmission tower. For example, a network operator may provide femto nodes to various different third parties. While the network operator may install and operate some femto nodes in the system 100, each femto node may be autonomously controlled as described herein, and can be added and removed from the system 100 in a flexible, ad-hoc manner, for example.

Each of the femto nodes 102a-d may provide service to one or more UEs, such as UEs 110, located within corresponding coverage areas 112a-d. For example, a coverage area 112a may be provided by femto node 102a, and so forth. It should be appreciated that coverage areas 112a-d may not have a regular or uniform geometrical shape, and may vary in shape and extent based on local factors such as topology of the landscape and the presence or absence of blocking objects in an area. Coverage areas 112a-d may also vary based on the receiving and transmitting capabilities of UEs 110 using a particular femto node 102a-d. For example, a UE having a transceiver with greater range capabilities may be able to make use of a particular femto node in a larger area than a UE with a less capable transceiver. Areas of overlap or interference may exist between adjacent coverage areas, as may coverage gaps.

System 100 optionally includes a femto gateway 108 with which the femto nodes 102a-d can communicate to access core network 104 via WAN 106. It is to be appreciated that a femto gateway 108 can instead be accessed by femto nodes 102a-d via WAN 106, though not shown. For example, femto nodes 102a-d can be HNBs, and femto gateway 108 can be a HNB gateway (HNB GW). Moreover, for example, femto gateway 108 can allow association among femto nodes 102a-d for different purposes, such as to calibrate transmit power for providing a certain network propagation, to allow handover of devices, such as UEs 110, among femto nodes 102a-d without requiring additional registration, to provide load balancing among the femto nodes 102a-d, etc. In addition, where femto nodes 102a-d implement restricted or hybrid access, femto gateway 108 typically can manage membership verification for some devices (e.g., devices that are not capable of interpreting restricted or hybrid access parameters received from femto nodes 102a-d).

In some examples, however, femto nodes 102a-d can use restricted or hybrid access parameters, such as a closed subscriber group (CSG) identifier, for other purposes. One such purpose may be to identify as a cluster of femto nodes that self-configure by adjusting transmit power to: provide continuous coverage; self-heal in case of femto node failure within the cluster (e.g., by increasing transmit power of the other femto nodes in the cluster); select cell selection/reselection thresholds among the cluster to allow a desired load or network propagation; and/or the like. Other such purposes may include communicating loading information to neighboring femto nodes using the restricted or hybrid access parameter (e.g., certain CSG identifiers or ranges of identifiers can indicate certain load percentages or values, etc.), indicating primary scrambling code (PSC) confusion in the neighborhood of the femto node using the restricted access parameter (e.g., certain CSG identifiers can be specific to indicating PSC confusion), and/or the like. In any case, where the restricted or hybrid access parameter is used for purposes other than restricted or hybrid access, membership verification at the femto nodes 102a-d and femto gateway 108 may not be needed.

Thus, in an example, femto nodes 102a-d and/or femto gateway 108 can avoid performing membership verification in such cases. In one example, femto nodes 102a-d can be preconfigured to refrain from performing membership verification (e.g., for certain UEs or all UEs 110). Similarly, in an example, femto gateway 108 can be preconfigured to refrain from performing membership verification (e.g., for certain femto nodes or all femto nodes 102a-d and/or for certain UEs or all UEs 110). In another example, femto nodes 102a-d can explicitly or implicitly request that femto gateway 108 not perform membership verification for certain or all UEs 110. For example, femto node 102b can explicitly request that femto gateway 108 not perform membership verification for some or all UEs during registration of the femto node 102b with core network 104 and/or femto gateway 108. In another example, femto node 102b can explicitly request that femto gateway 108 not perform membership verification for a given UE 110 during registration of the UE 110 with core network 104. In one example, femto node 102b can implicitly request femto gateway 108 to not perform membership verification for a given UE 110 that is not capable of interpreting restricted or hybrid access parameters (e.g., a non-CSG UE) by registering the UE 110 as capable of restricted or hybrid access functionality (e.g., a CSG UE). This causes the femto gateway 108 to rely on core network 104 for performing access control or membership verification related to UE 110 based on CSG subscription information for the UE 110.

Figure 2:
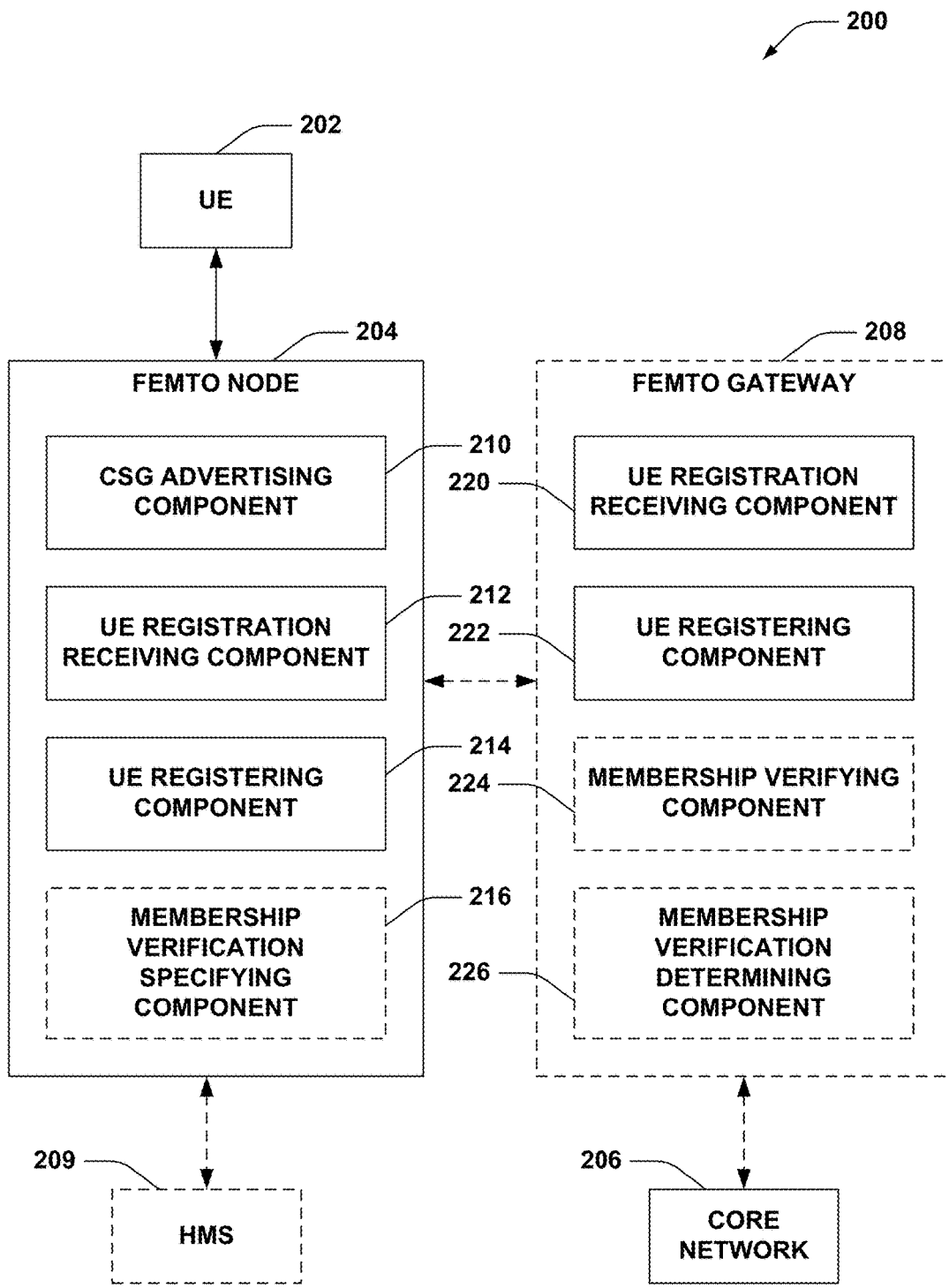
FIG. 2 is a block diagram of an example system for refraining from performing membership verification for user equipment (UE) registering with a femto node.

Referring to FIG. 2, an example wireless communication system 200 is illustrated that facilitates registering UEs on a femto node advertising CSG identifier while avoiding membership verification. System 200 includes UE 202 that communicates with a femto node 204 to access core network 206. System 200 can also include a femto gateway 208 through which femto node 204 can access core network 206. Femto gateway 208 can operate to coordinate communication parameters among multiple femto nodes, including femto node 204. UE 202 can be a mobile terminal, stationary device, modem (or other tethered devices), a portion thereof, and/or substantially any device that wirelessly communicates with femto nodes. Femto node 204, for example, can be substantially any low power base station, or portion thereof, as described, a UE (e.g., communicating in peer-to-peer or ad-hoc mode with other UEs), etc. Core network 206 can include various components of a wireless network, such as one or more serving or packet data network (PDN) gateways, a mobility management entity (MME), a policy charging and rules function (PCRF), a home location register (HLR), a home subscriber server (HSS), etc. Femto gateway 208 can be a HNB gateway or other gateway that communicates with multiple femto nodes and/or core network 206 components. An optional HNB management system (HMS) 209 is also shown for configuring and/or managing femto node 204 and/or other femto nodes.

Femto node 204 can include a CSG advertising component 210 for broadcasting parameters in a wireless network related to restricted or hybrid access, such as a CSG identifier, a UE registration receiving component 212 for obtaining a registration request from one or more UEs, and a UE registering component 214 for requesting UE registration from a core network or femto gateway. Femto node 204 can optionally include a membership verification specifying component 216 for indicating whether a femto gateway should perform membership verification for one or more UEs registering with femto node 204.

Femto gateway 208 can include a UE registration receiving component 220 for obtaining a UE registration request from a femto node, and a UE registering component 222 for communicating a UE registration request to a core network. Femto gateway 208 can optionally include a membership verifying component 224 for determining whether a UE registering with femto node 204 is allowed to access or is member of femto node, and/or a membership verification determining component 226 for determining whether to perform membership verification for UEs registering with one or more femto nodes.

According to an example, femto nodes, such as femto node 204, can operate in an open access mode where substantially any UE is allowed access to the femto node, a closed access mode where only some UEs are allowed to access the femto node (e.g., UEs in a closed subscriber group (CSG) advertised by the femto node, as described further herein), or a hybrid access mode where the femto node can provide varying levels of access to a given UE (e.g., improved access to UEs that are members of the CSG—referred to as member UEs—as opposed to those that are not members of the CSG—referred to as non-member UEs). CSG advertising component 210, in these examples, can broadcast an indicator of whether restricted access is implemented (e.g., in closed or hybrid access mode), and/or a corresponding restricted access parameter (e.g., CSG identifier).

CSG advertising component 210, however, can use a restricted or hybrid access parameter, such as a CSG identifier, for purposes other than advertising restricted or hybrid access. In this example, femto node 204 can appear to UEs, such as UE 202, as a restricted or hybrid access femto node, but can operate in core network 206 and/or with femto gateway 208 as an open access mode femto node, such that membership verification for UEs accessing femto node 204, such as UE 202, is not required. In one example, femto node 204 can indicate to core network 206 and/or femto gateway 208 that it operates using an open access mode. Membership verification can require additional processing and resources of the UE 202 and/or an insecure transmission of the UE's 202 IMSI. Thus, refraining from performing membership verification can allow the femto node 204 and UE 202 to conserve resources and/or avoid the insecure IMSI transmission.

In one example, UE 202 can attempt registration with femto node 204. UE 202 can be a non-CSG UE or other UE incapable of associating with restricted or hybrid access femto nodes. In another example, CSG advertising component 210 can advertise a CSG identifier that is not in a whitelist of accessible CSGs of any UEs. In this regard, a hybrid access femto node 204 appears as an open femto node to all UEs. In any case, UE registration receiving component 212 can obtain a registration request from UE 202, and UE registering component 214 can communicate registration information of UE 202 to femto gateway 208 and/or core network 206 in the same or another registration request for UE 202. For example, this can include a UE REGISTRAION REQUEST message transmitted to femto gateway 208. UE registration receiving component 220 can obtain the registration information from femto node 204, in one example, and membership verifying component 224 typically may attempt membership verification for the UE 202 based on femto node 204 advertising restricted or hybrid access. In the following examples, however, functionality is provided such that membership verifying component 224 does not attempt membership verification for the UE 202, as femto node is not advertising restricted or hybrid access to provide restricted or hybrid UE access.

In one example, femto node 204 and/or femto gateway 208 can be preconfigured to refrain from performing membership verification. Thus, femto node 204 and/or femto gateway 208 can receive configuration information from one or more components of core network 206, one or more configuration servers (e.g., HMS 209 or configuration server communicating with femto gateway 208), etc. to not perform membership verification for a set of UEs, all UEs, etc. In this example, UE registering component 214 can obtain the configuration information from the core network 206, from a configuration server (e.g., HMS 209), from a configuration set by an operator of the femto node 204, from the femto gateway 208, etc., and can communicate registration information of UE 202 to femto gateway 208 or core network 206, without membership verification, regardless of whether UE 202 supports CSG functionality, based on this configuration information. Where UE 202 has a temporary mobile subscriber identity (TMSI) (e.g., UE 202 has been connected to core network 206), and registers with femto node 204 from idle mode, for example, UE registration receiving component 212 can obtain the TMSI of UE 202 in the registration request, and UE registering component 214 can communicate the TMSI of UE 202 to femto gateway 208 as part of the registration information for UE 202.

Additionally, in this example, UE registering component 222 can obtain the configuration information from the core network 206, from a configuration server for the femto gateway 208 (not shown), from a configuration set by an operator of the femto gateway 208, from the femto gateway 208, etc. In this example, UE registration receiving component 220 obtains the UE 202 registration information in the registration request from femto node 204 including the TMSI, and UE registering component 222 communicates the registration information to core network 206 without employing membership verifying component 224 to perform membership verification for UE 202. Where UE 202 does not have a TMSI (e.g., upon an initial attachment where the UE 202 is powered on, the TMSI is lost or expired, etc.), UE 202 can perform an attach procedure providing its IMSI to femto node 204 in an attachment request. In this example, UE registration receiving component 212 obtains the IMSI, and UE registering component 214 communicates registration information with the IMSI to femto gateway 208. UE registration receiving component 220 can similarly receive the registration information from femto node 204 in the corresponding registration request, and UE registering component 222 can communicate associated registration information for UE 202 with the IMSI to core network 206 without membership verifying component 224 performing membership verification for UE 202.

In another example, femto node 204 can indicate to femto gateway 208 to refrain from performing membership verification for one or more UEs attempting access via femto node 204, such as UE 202. The indication can be explicit or implicit, as described. Thus, in one example, membership verification specifying component 216 can request femto gateway 208 to refrain from performing membership verification for UE 202. This can be indicated during the registration process, in one example, such as part of the registration request for UE 202 communicated by UE registering component 214 or another message. Membership verification determining component 226 can obtain the request to refrain from performing membership verification for UE 202 from the UE registration request or other message. In this example, membership verifying component 224 refrains from performing membership verification based on the explicit request. It is to be appreciated that the request can occur outside of UE registration as well, based on information received from core network 206 for UE 202 (e.g., subscription information), during a registration procedure for femto node 204 with femto gateway 208, and/or the like.

In addition, for example, membership verification specifying component 216 can request that femto gateway 208 refrain from performing membership verification for any UEs registered through femto node 204. For example, membership verification specifying component 216 can specify this indication during an initial registration of femto node 204 with femto gateway 208, and membership verification determining component 226 can receive the indication. In this example, membership verifying component 224 can determine to avoid membership verification for UE registration requests received from femto node 204, though membership verification can continue for other femto nodes (not shown). In this example, membership verification specifying component 216 can request that femto gateway 208 refrain from performing membership verification for UEs registering with femto node 204 in an HNB REGISTER REQUEST sent to femto gateway 208. In an example, the HNB REGISTER REQUEST can also indicate an open access mode and/or refrain from indicating a CSG identifier, as the femto node 204 intends to operate as an open femto node to the core network 206 and femto gateway 208. In another example, membership verification specifying component 216 requests that femto gateway 208 refrain from performing membership verification for all UEs as part of utilizing the CSG identifier for other purposes. In this example, CSG advertising component 210 can switch to using the CSG identifier for restricted or hybrid access, and membership verification specifying component 216 can accordingly request the femto gateway 208 perform membership verification for UEs registering via femto node 204.

In an example, femto node 204 can implicitly cause femto gateway 208 to not perform membership verification for UE 202 by indicating that UE 202 is capable of performing CSG functions (e.g., by indicating that UE 202 is a CSG UE), though UE 202 may not be so capable. In this example, UE registration receiving component 212 obtains a registration request from UE 202, which can not include an indication of CSG capability for UE 202, and UE registering component 214 sends registration information to femto gateway 208 (e.g., with IMSI, TMSI, etc., as described above), where the registration information also indicates that UE 202 is a CSG UE (e.g., a CSG capability value in the registration information is set to true). In this example, UE registration receiving component 220 receives the registration information, and UE registering component 222 requests registration for UE 202. In this example, membership verifying component 224 refrains from performing membership verification for UE 202 because UE 202 is indicated as a CSG UE. In such cases, core network 206 performs access control for UE 202, and thus, femto gateway 208 does not perform membership verification.

It is to be appreciated that femto node 204 and/or femto gateway 208 can avoid membership verification in other scenarios as well. For example, membership verification may be implemented in core network 206, in which case it can be desirable to avoid verification at femto node 204 and femto gateway 208 so that UE 202 need not transmit its IMSI over the air. In this example, femto node 204 can explicitly or implicitly indicate to femto gateway 208 not to perform membership verification, as described above, and upon UE registration receiving component 212 receiving a request for UE registration, UE registering component 214 can send an appropriate UE registration message to perform membership verification in core network 206 (e.g., a Radio Access Network Application Part (RANAP) initial UE message).

In another example, UE 202 can preferentially camp on hybrid femto nodes. Camping occurs when a UE communicates with a femto node in an idle mode such that the UE receives paging or other minimal communications from the femto node at a known time interval; thus, the UE can power down its radio or other equipment during the idle time intervals where no communication is expected from the femto node. In this regard, UE 202 can camp on hybrid femto nodes to receive certain services or other benefits while camping, but in some cases, the hybrid femto nodes may not implement preferential treatment for member UEs. In such examples, femto node 204 can similarly register UEs, such as UE 202, with an indication that femto gateway 208 refrain from performing membership verification.

Figure 3:
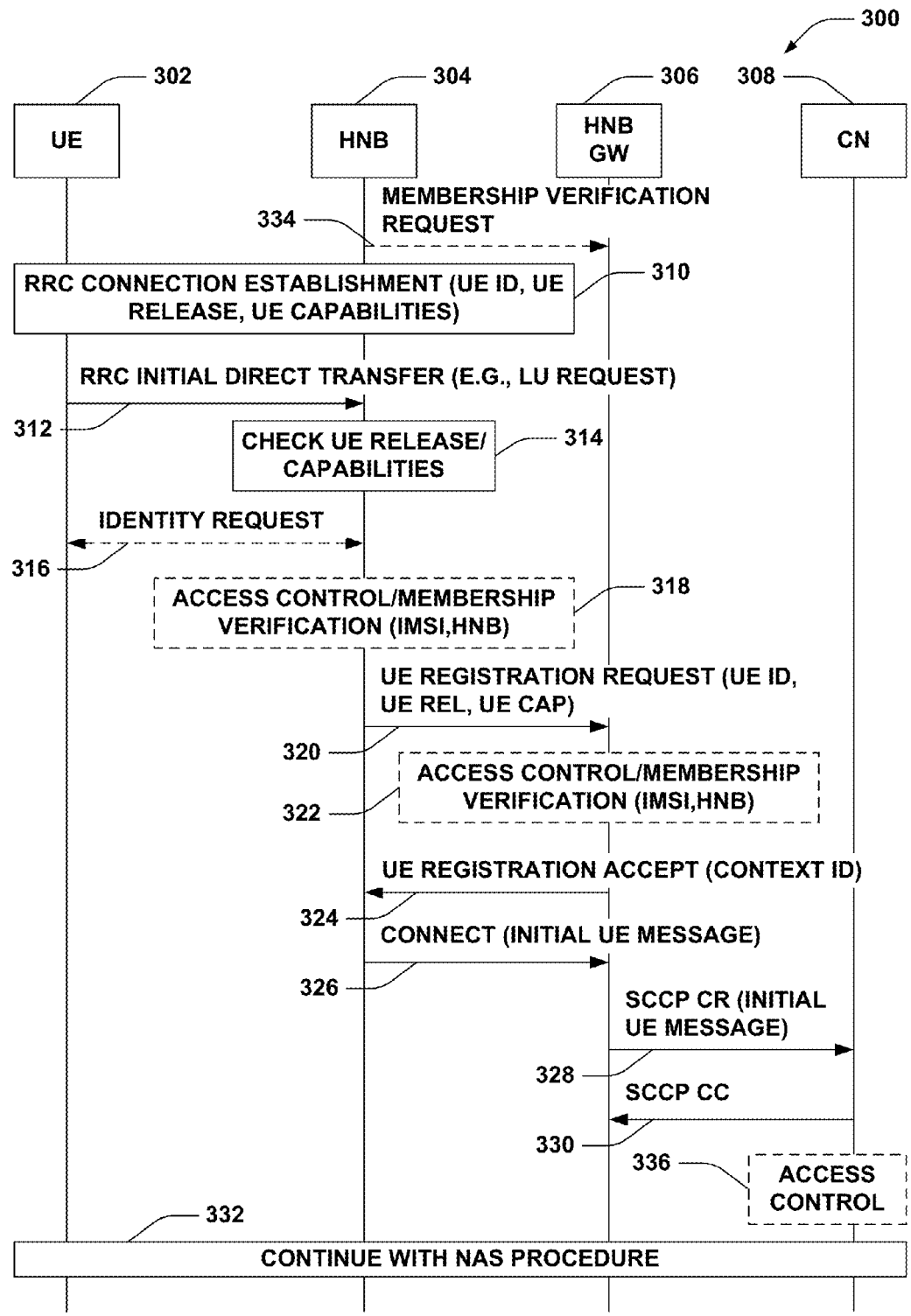
FIG. 3 is a block diagram of an example system for refraining from performing membership verification for at least some UEs.

Turning to FIG. 3, an example wireless communication system 300 is illustrated for UE registration with a HNB 304 advertising CSG identifier. System 300 includes UE 302 that requests registration from a HNB 304 for accessing a core network (CN) 308. System 302 also includes a HNB GW 306 for managing one or more HNBs, including HNB 304. In this specific example, UE 302 can initially camp on HNB 304, as described previously, and initiates a non-access stratum (NAS) procedure (e.g., a location update (LU) procedure) to register with CN 308 via HNB 304. UE 302 initiates the NAS procedure by establishing an RRC connection 310. UE 302 reports its identifier (e.g., TMSI, if assigned, or IMSI), a release version of the UE, capabilities of the UE 302 (such as a CSG capability), an Establishment Clause, etc. as part of the RRC connection establishment procedure 310. In addition, UE 302 communicates an RRC initial direct transfer 312 to HNB 304, which can include the initial NAS message (e.g., the LU request message).

In previous implementations, the HNB 304 would perform an identity request 316 with UE 302 to acquire its IMSI where the identifiers communicated by the UE 302 in previous steps included a TMSI unknown to HNB 304 and where the UE 302 indicated no CSG capabilities. This step was performed to allow access control/membership verification 318 at HNB 304 and/or access control/membership verification 322 at HNB GW 306 based on the IMSI, and also included an insecure transmittal of the IMSI from UE 302 to HNB 304. Aspects described herein mitigate the need for such steps in at least some cases.

In one example, HNB 304 and HNB GW 306 are preconfigured not to perform access control/membership verification 318 and 322, respectively, and thus HNB 304 need not perform identity request 316 either. In this example, after RRC connection establishment procedure 310 and receiving RRC initial direct transfer 312, HNB 304 can communicate a UE registration request 320 to HNB GW 306 with the identifier (e.g., TMSI) received during the RRC connection establishment procedure 310, the release, capabilities, etc. Similarly, HNB GW 306 communicates a UE registration accept 324 to HNB 304 for UE 302 without performing access control/membership verification 322. HNB 304 accordingly forwards a connect request with initial UE message 326 to HNB GW 306, and HNB GW 306. This can include a RANAP user adaptation (RUA) connect message with the RANAP initial UE message. HNB GW 306 accordingly communicates a signaling connection control part (SCCP) connection request (CR) with the initial UE message 328 to CN 308. CN 308 communicates the SCCP connection confirm (CC) 330 to HNB GW 306, and the NAS procedure continues at 332 to register UE 302 at HNB 304.

In another example, HNB 304 indicates to HNB GW 306 not to perform membership verification for certain UEs or all UEs registering at HNB 304. In one example, HNB 304 explicitly indicates to HNB GW 306 not to perform membership verification in a membership verification request 334. For example, the membership verification request 334 can occur upon registration of HNB 304 with HNB GW 306, or some other time before UE 302 registers with HNB 304. In another example, HNB 304 can indicate a request to not perform membership verification in the UE registration request 320 for UE 302. In either case, after receiving UE registration request 320 from HNB 304, HNB GW can communicate a registration accept 324 and request connection for UE 302 without performing membership verification 322.

In yet another example, HNB 304 implicitly causes HNB GW 306 to refrain from performing membership verification. In this example, though HNB 304 determines UE 302 is not CSG-capable (e.g., while checking UE release/capabilities at 314), HNB can specify CSG capability for UE 302 in UE registration request 320. This does not trigger membership verification at HNB GW 306, as CSG-capable UEs are access controlled by CN 308 at 336. Thus, again, HNB GW 306 accepts registration 324 without performing access control/membership verification 322. In the foregoing examples, UE 302 is able to register with HNB 304 regardless of CSG membership, though the HNB 304 advertises CSG identifier.

FIGS. 4-7 illustrate example methodologies relating to refraining from performing membership verification for certain UEs at femto nodes advertising CSG identifier. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4:
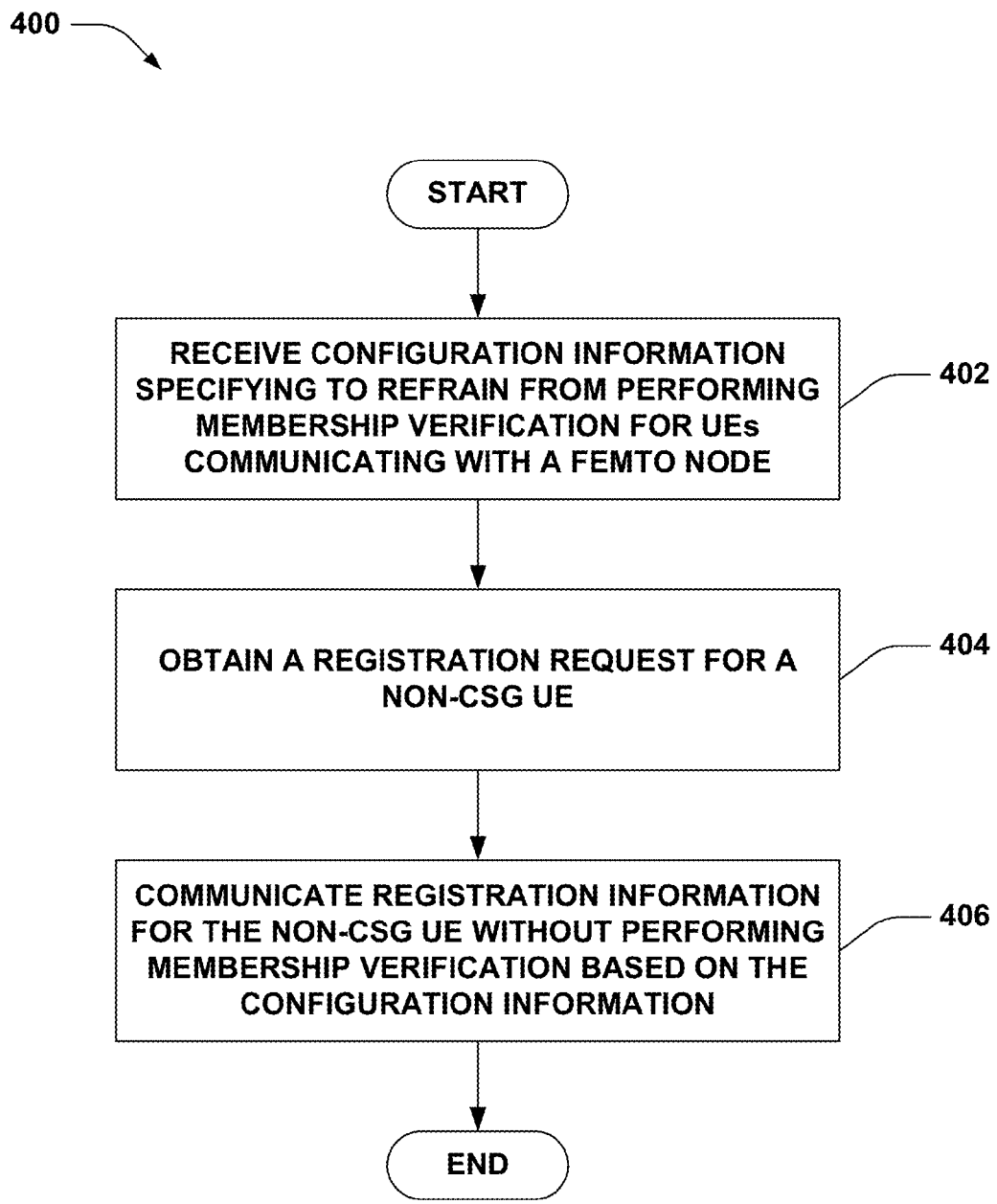
FIG. 4 is a flow chart of an aspect of an example methodology for refraining from performing membership verification based on configuration information.

FIG. 4 illustrates an example methodology 400 for refraining from performing membership verification for UEs incapable of performing restricted access functions. In one example, the methodology 400 can be performed by femto nodes 102a-d or 204, femto gateways 108 or 208, HNB 304, HNB GW 306, or related components, processors, etc.

At 402, configuration information specifying to refrain from performing membership verification for UEs communicating with a femto node can be received. For example, this can include receiving the configuration information from a femto gateway, from a core network upon registering therewith, from an operator of a femto node or femto gateway, and/or the like. In example, the configuration information can relate to certain UEs or all UEs for which registration requests are received.

At 404, a registration request is obtained for a non-CSG UE. For example, the non-CSG UE can perform a RRC connection establishment procedure that specifies a UE identifier, UE capabilities, and/or the like. In addition, the registration request can be obtained from the non-CSG UE, from a femto node, and/or the like.

At 406, registration information for the non-CSG UE can be communicated without performing membership verification based on the configuration information. For instance, refraining from performing the membership verification can be based on receiving the configuration information and/or based on advertising CSG identifier for purposes other than providing restricting or hybrid access (e.g., advertising restricted or hybrid access via the CSG identifier while maintaining an open access mode with the core network). Moreover, communicating the registration information can include communicating such to a femto gateway or core network, etc. In addition, the registration information can include an IMSI, TMSI, etc., of the UE.

Figure 5:
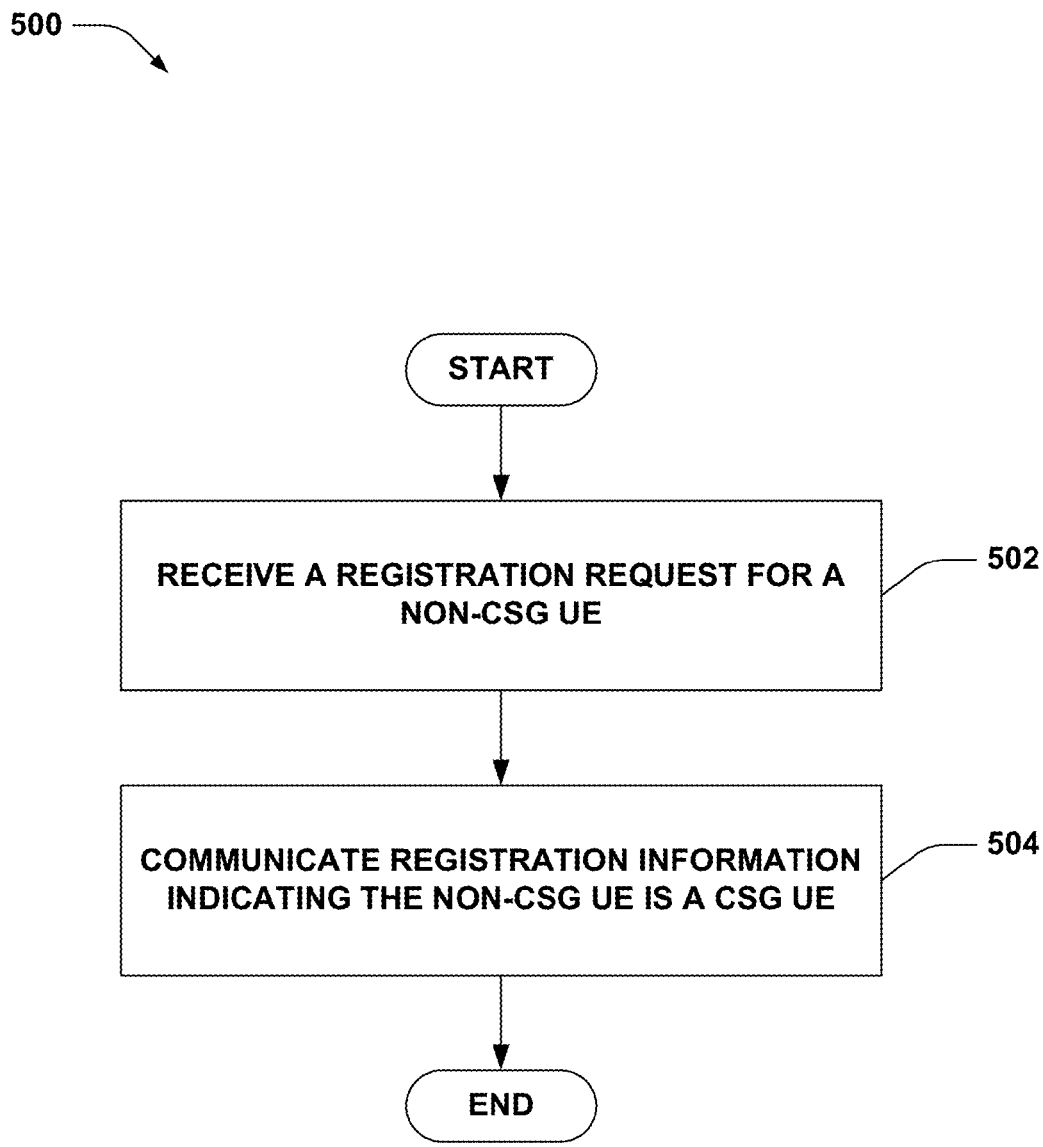
FIG. 5 is a flow chart of an aspect of an example methodology for refraining from performing membership verification by indicating a non-closed subscriber group (CSG) UE as a CSG UE.

FIG. 5 depicts an example methodology 500 for communicating registration information for non-CSG UEs. In one example, the methodology 500 can be performed by femto nodes 102a-d or 204, femto gateway 108 or 208, HNB 304, HNB GW 306, or related components, processors, etc.

At 502, a registration request can be received for a non-CSG UE. For example, the registration request can be received from the non-CSG UE, at a femto node broadcasting CSG identifier. The registration request can indicate UE capabilities, in one example, and it can be determined that the UE is not CSG-capable (e.g., a non-CSG UE) based on the capabilities.

At 504, the registration information can be communicated indicating that the non-CSG UE is a CSG UE. For example, this can include communicating the registration information to a femto gateway or core network in a registration request for the UE specifying the UE as a CSG UE to mitigate membership verification being performed at the femto node or femto gateway. In an example, information received in the registration request can be modified as part of the registration information to indicate the UE as CSG-capable (e.g., CSG capability can be added to the UE capabilities in the registration request). Thus, a femto node receiving the registration information can forego membership verification as CSG capability indicates that the core network performs access control for the UE.

In addition, as described, indicating the non-CSG UE as a CSG UE, at 504, can be performed further based on using CSG identifier for purposes other than providing restricted or hybrid access. In other examples, indicating the non-CSG UE as a CSG UE, at 504, can be performed where membership verification is to be implemented in the core network, where preferential camping is employed for UEs without preferential treatment at the corresponding femto nodes, etc., as described above.

Figure 6:
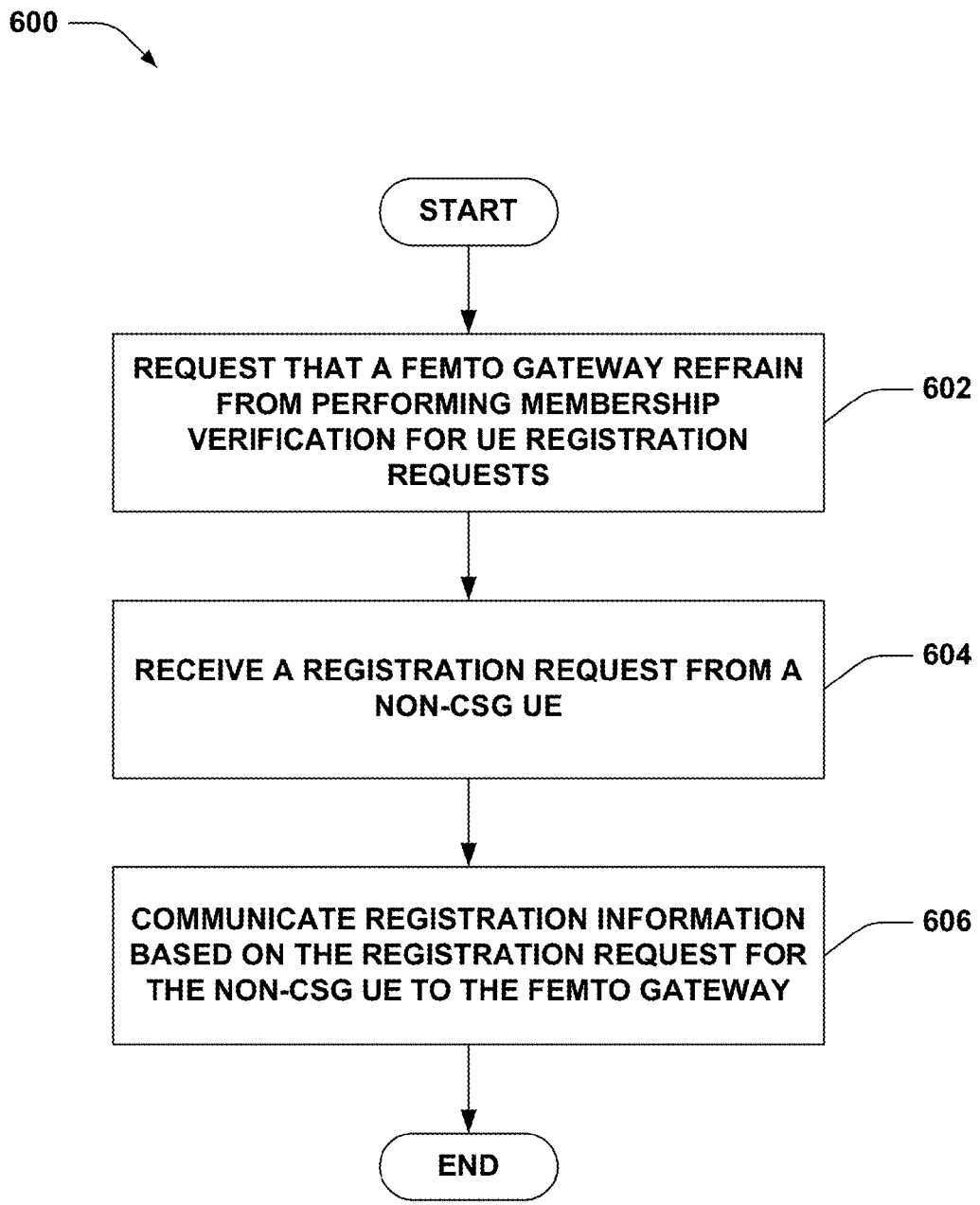
FIG. 6 is a flow chart of an aspect of an example methodology for requesting that a femto gateway refrain from performing membership verification for one or more UEs.

FIG. 6 illustrates an example methodology 600 for requesting a femto gateway to refrain from performing membership verification. In one example, the methodology 600 can be performed by femto nodes 102a-d or 204, HNB 304, or related components, processors, etc.

At 602, it can be requested that a femto gateway refrain from performing membership verification for UE registration requests. For example, this can include transmitting the request to the femto gateway as part of an initial registration therewith or with the core network. In another example, this can include indicating the request as part of forwarding a UE registration request or related registration information, etc. In any case, the request can be made based on using CSG identifier for purposes other than providing restricted or hybrid access, as described above. Moreover, requesting that femto gateway refrain from performing membership verification can be performed further where membership verification is to be implemented in the core network, where preferential camping is employed for UEs without preferential treatment at the corresponding femto nodes, etc., as described above.

At 604, a registration request can be received from a non-CSG UE. This can include receiving the registration request over-the-air at a femto node. The request can indicate that the UE is a non-CSG UE (e.g., based on an absence of CSG capabilities in a received list of UE capabilities).

At 606, registration information can be communicated based on the registration request for the non-CSG UE to the femto gateway. This can include transmitting a registration request for the UE to the femto gateway, as described. The femto gateway can refrain from performing membership verification based on the request at 602. As described, in one example, the registration information at 606 can include the request to refrain from performing membership verification.

Figure 7:
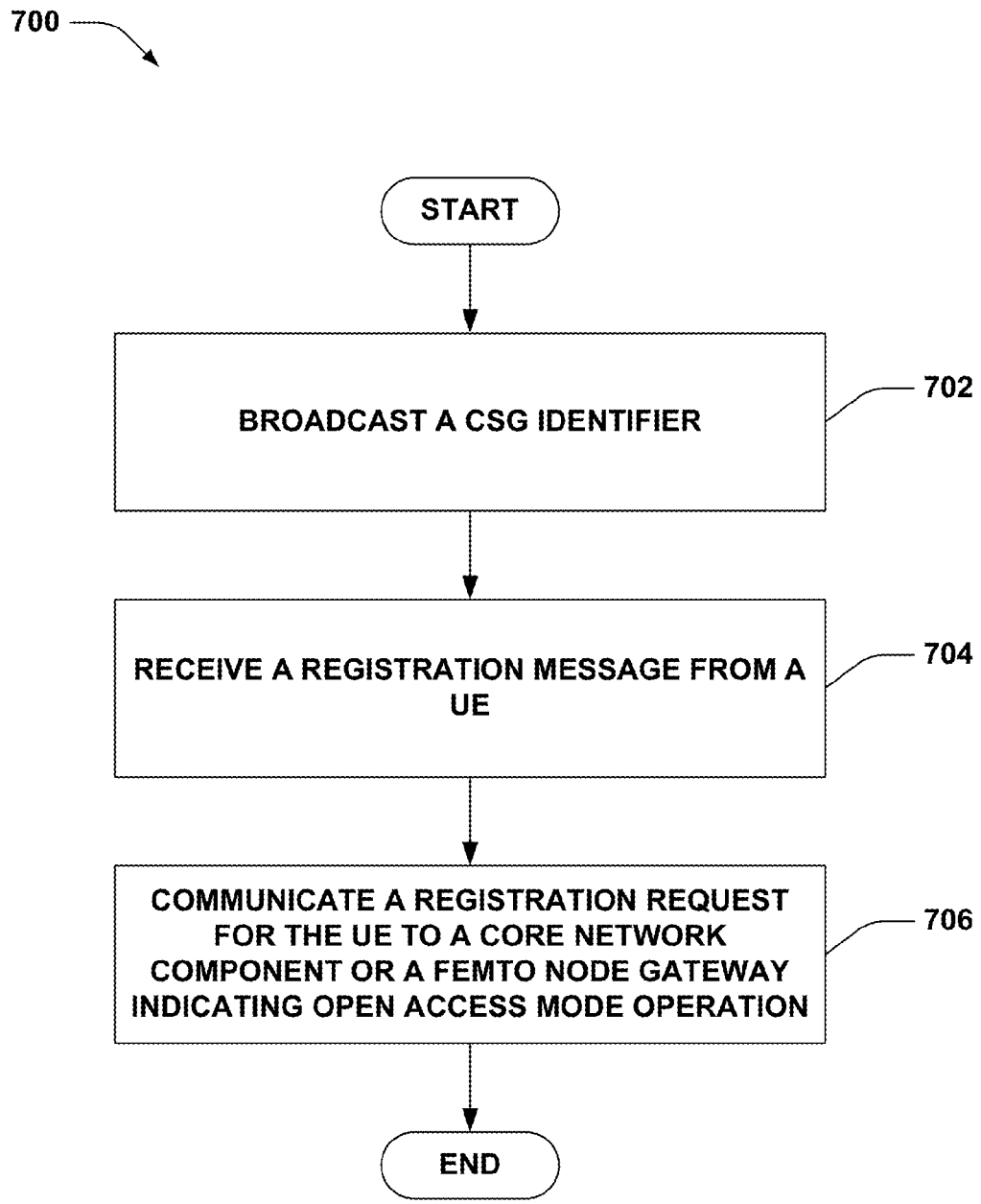
FIG. 7 is a flow chart of an aspect of an example methodology for avoiding membership verification for one or more UEs.

FIG. 7 illustrates an example methodology 700 for avoiding membership verification for one or more UEs. In one example, the methodology 700 can be performed by femto nodes 102a-d or 204, HNB 304, or related components, processors, etc.

At 702, a CSG identifier can be broadcasted. This can include broadcasting the CSG identifier in one or more system message (e.g., system information blocks). Typically CSG identifiers indicate hybrid or restricted access to one or more UEs, as described, but can be used in this case for other purposes.

At 704, a registration message can be received from a device. This can include receiving the message from a non-CSG UE that does not interpret the CSG identifier.

At 706, a registration request can be communicated for the UE to a core network component or a femto node gateway indicating open access mode operation. Thus, the femto node gateway or core network need not perform membership verification for the UE due to the indicated open access mode operation.

It will be appreciated that, in accordance with one or more aspects described herein, inferences can be made regarding determining whether to perform membership verification, determining to indicate a non-CSG UE is a CSG UE, advertising CSG identifier for other purposes, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
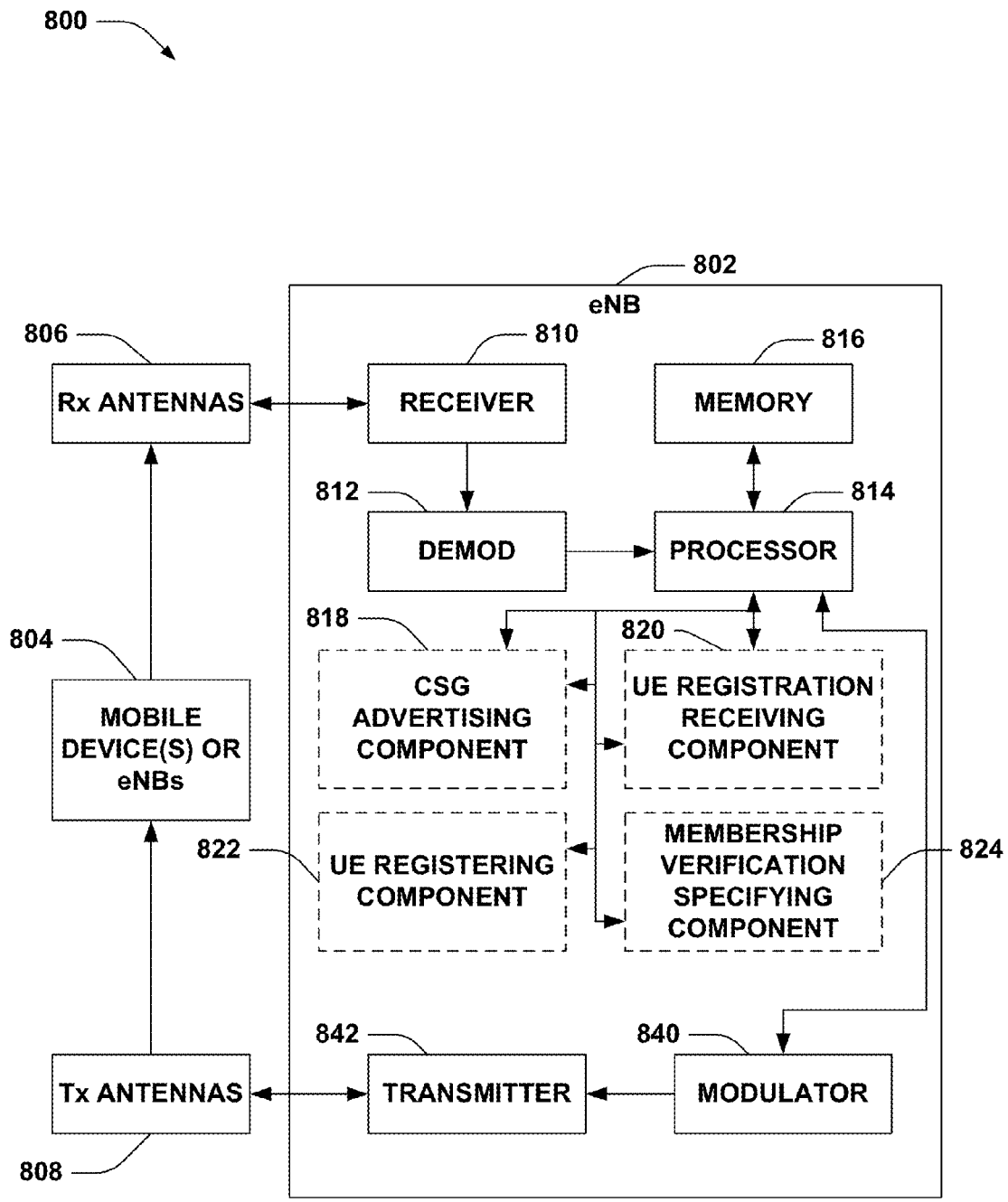
FIG. 8 is a block diagram of a system in accordance with aspects described herein.

FIG. 8 is an illustration of a system 800 that facilitates mitigating membership verification for UEs at a femto node or femto gateway. System 800 includes a eNB 802 having a receiver 810 that receives signal(s) from one or more mobile devices or eNBs 804 through a plurality of receive antennas 806 (e.g., which can be of multiple network technologies), and a transmitter 842 that transmits to the one or more mobile devices or eNBs 804 through a plurality of transmit antennas 808 (e.g., which can be of multiple network technologies). For example, eNB 802 can transmit signals received from eNBs 804 to other eNBs 804, and/or vice versa. Receiver 810 can receive information from one or more receive antennas 806 and is operatively associated with a demodulator 812 that demodulates received information. In addition, in an example, receiver 810 can receive from a wired backhaul link. Though depicted as separate antennas, it is to be appreciated that at least one of receive antennas 806 and a corresponding one of transmit antennas 808 can be combined as the same antenna. Demodulated symbols are analyzed by a processor 814, which is coupled to a memory 816 that stores information related to performing one or more aspects described herein.

Processor 814, for example, can be a processor dedicated to analyzing information received by receiver 810 and/or generating information for transmission by a transmitter 842, a processor that controls one or more components of eNB 802, and/or a processor that analyzes information received by receiver 810, generates information for transmission by transmitter 842, and controls one or more components of eNB 802. In addition, processor 814 can perform one or more functions described herein and/or can communicate with components for such a purpose.

Memory 816, as described, is operatively coupled to processor 814 and can store data to be transmitted, received data, information related to available channels, data associated with analyzed signal and/or interference strength, information related to an assigned channel, power, rate, or the like, and any other suitable information for estimating a channel and communicating via the channel. Memory 816 can additionally store protocols and/or algorithms associated with advertising restricted access, registering UEs, refraining from performing membership verification or requesting such of other nodes, and/or the like.

It will be appreciated that the data store (e.g., memory 816) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 816 of the subject systems and methods is intended to comprise, without being limited to, these and any other suitable types of memory.

Processor 814 is further optionally coupled to a CSG advertising component 818, which can be similar to CSG advertising component 210, a UE registration receiving component 820, which can be similar to UE registration receiving component 212, a UE registering component 822, which can be similar to UE registering component 214, and/or a membership verification specifying component 824, which can be similar to membership verification specifying component 216. Moreover, for example, processor 814 can modulate signals to be transmitted using modulator 840, and transmit modulated signals using transmitter 842. Transmitter 842 can transmit signals to mobile devices or eNBs 804 over Tx antennas 808. Furthermore, although depicted as being separate from the processor 814, it is to be appreciated that the CSG advertising component 818, UE registration receiving component 820, UE registering component 822, membership verification specifying component 824, demodulator 812, and/or modulator 840 can be part of the processor 814 or multiple processors (not shown), and/or stored as instructions in memory 816 for execution by processor 814.

Figure 9:
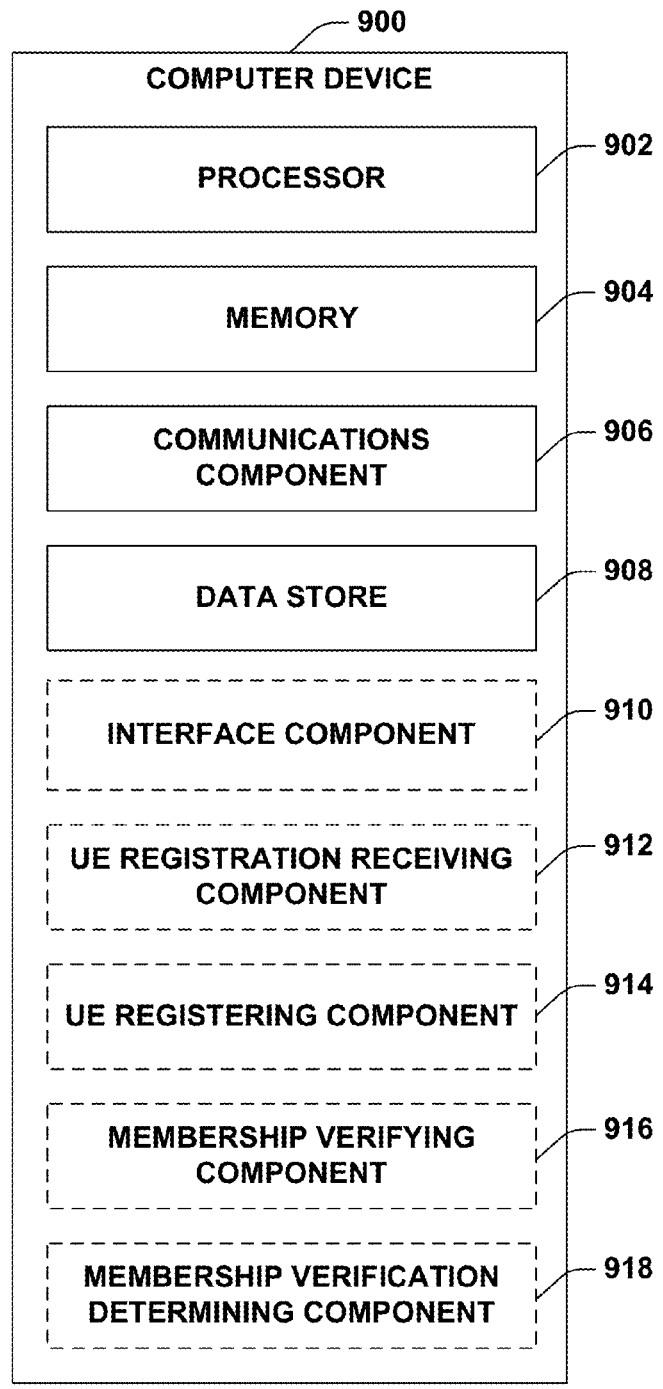
FIG. 9 is a block diagram of an example computer device in accordance with aspects described herein.

FIG. 9 illustrates a computer device 900 that can include a femto gateway 208, HNB GW 306, etc. Computer device 900 includes a processor 902 for carrying out processing functions associated with one or more of components and functions described herein. Processor 902 can include a single or multiple set of processors or multi-core processors. Moreover, processor 902 can be implemented as an integrated processing system and/or a distributed processing system.

Computer device 900 further includes a memory 904, such as for storing local versions of applications being executed by processor 902. Memory 904 can include substantially any type of memory usable by a computer, such as random access memory (RAM), read only memory (ROM), tapes, magnetic discs, optical discs, volatile memory, nonvolatile memory, and any combination thereof. Computer device 900 also includes one or more components 906-918, which can be stored in memory 904, executed by processor 902 (e.g., based on instructions stored in memory 904), be implemented within one or more processors 902, and/or the like.

Further, computer device 900 includes a communications component 906 that provides for establishing and maintaining communications with one or more parties utilizing hardware, software, and services as described herein. Communications component 906 may carry communications between components on computer device 900, as well as between computer device 900 and external devices, such as devices located across a communications network and/or devices serially or locally connected to computer device 900. For example, communications component 906 may include one or more buses, and may further include transmit chain components and receive chain components associated with a transmitter and receiver, respectively, operable for interfacing with external devices.

Additionally, computer device 900 may further include a data store 908, which can be any suitable combination of hardware and/or software, that provides for mass storage of information, databases, and programs employed in connection with aspects described herein. For example, data store 908 may be a data repository for applications not currently being executed by processor 902.

Computer device 900 may optionally include an interface component 910 operable to receive inputs from a user of computer device 900, and further operable to generate outputs for presentation to the user. Interface component 910 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 910 may include one or more output devices, including but not limited to a display, a speaker, a haptic feedback mechanism, a printer, any other mechanism capable of presenting an output to a user, or any combination thereof. In another example, interface component 910 can be an application programming interface (API) that can be accessed by one or more devices to perform functions on computer device 900.

In addition, in the depicted example, computer device 900 can optionally include one or more of a UE registration receiving component 912, which can be similar to UE registration receiving component 220, a UE registering component 914, which can be similar to UE registering component 222, a membership verifying component 916, which can be similar membership verifying component 224, and/or a membership verification determining component 918, which can be similar to membership verification determining component 226. Thus, these components 912, 914, 916, and/or 918 can utilize processor 902 to execute instructions associated therewith, memory 904 to store information associated therewith, communications component 906 to carry out communications, and/or the like, as described. In addition, it is to be appreciated that computer device 900 can include additional or alternative components described herein.

Figure 10:
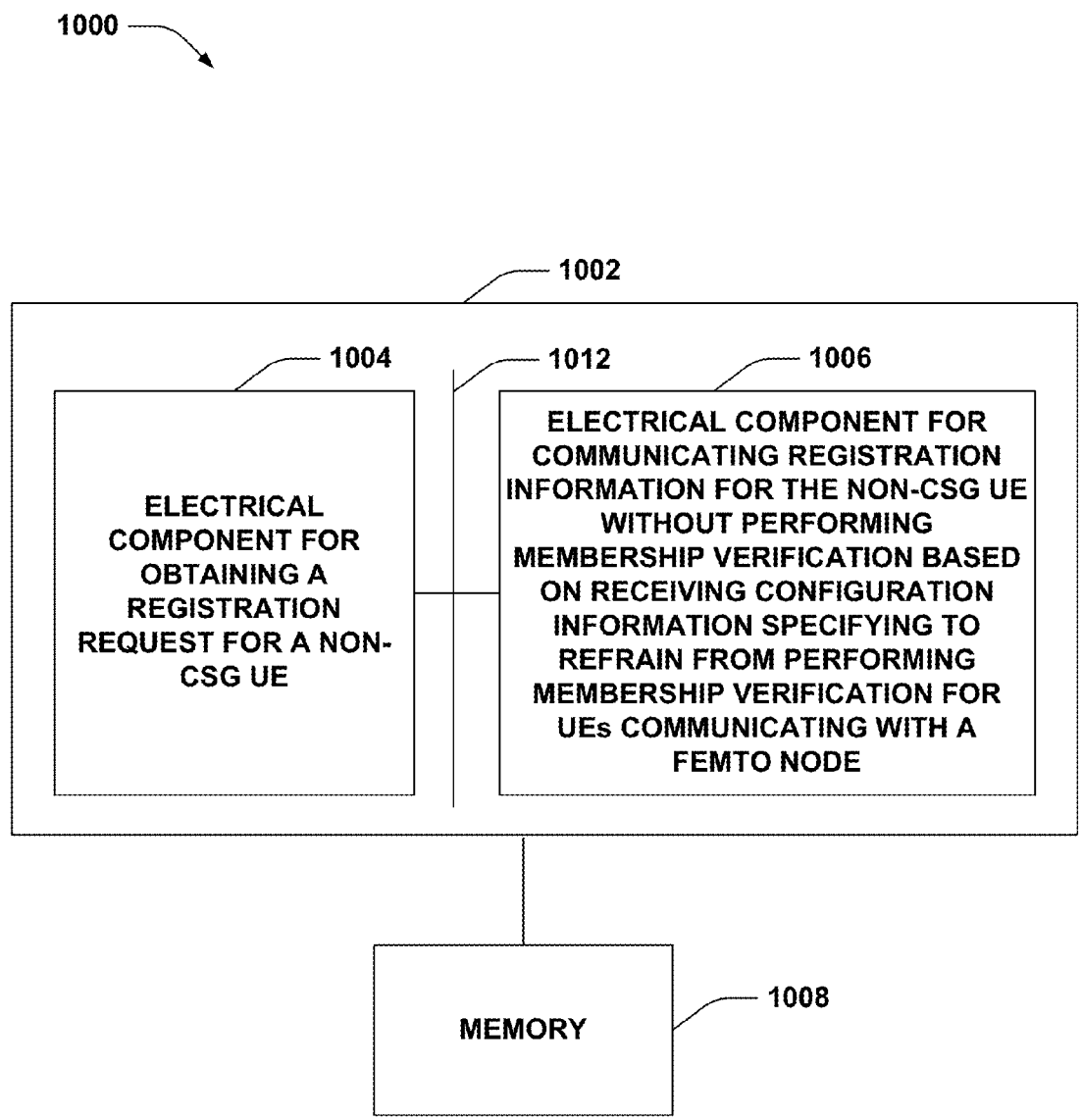
FIG. 10 is a block diagram of an aspect of a system that refrains from performing membership verification based on configuration information.

FIG. 10 illustrates a system 1000 for refraining from performing membership verification for one or more UEs. For example, system 1000 can reside at least partially within a femto node or other low power base station, a femto gateway, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for obtaining a registration request for a non-CSG UE 1004. Further, logical grouping 1002 can include an electrical component for communicating registration information for the non-CSG UE without performing membership verification based on receiving configuration information specifying to refrain from performing membership verification for UEs communicating with a femto node 1006.

For example, electrical component 1004 can include a UE registration receiving component 212 or 220, etc., as described above. In addition, for example, electrical component 1006, in an aspect, can include a UE registering component 214 or 222, as described.

Additionally, system 1000 can include a memory 1008 that retains instructions for executing functions associated with the electrical components 1004 and 1006. While shown as being external to memory 1008, it is to be understood that one or more of the electrical components 1004 and 1006 can exist within memory 1008. Moreover, for example, electrical components 1004 and 1006 can be interconnected by a bus 1012. In one example, electrical components 1004 and 1006 can include at least one processor, or each electrical component 1004 and 1006 can be a corresponding module of at least one processor. Moreover, in an additional or alternative example, electrical components 1004 and 1006 can be a computer program product comprising a computer readable medium, where each electrical component 1004 and 1006 can be corresponding code.

Figure 11:
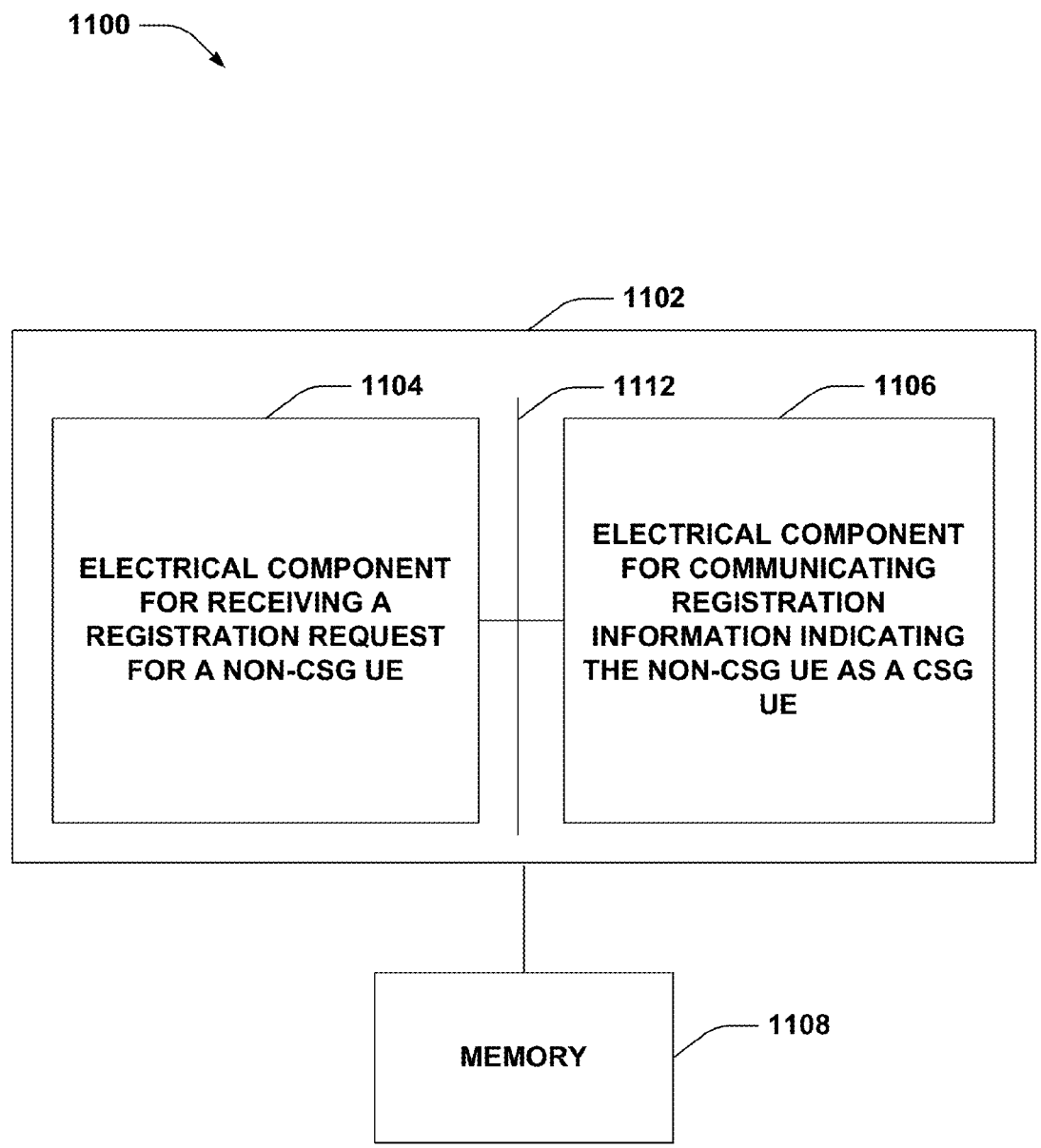
FIG. 11 is a block diagram of an aspect of a system that refrains from performing membership verification by indicating a non-CSG UE as a CSG UE.

FIG. 11 illustrates a system 1100 for refraining from performing membership verification for one or more UEs. For example, system 1100 can reside at least partially within a femto node or other low power base station, a femto gateway, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving a registration request for a non-CSG UE 1104. Further, logical grouping 1102 can include an electrical component for communicating registration information indicating the non-CSG UE as a CSG UE 1106.

For example, electrical component 1104 can include a UE registration receiving component 212 or 220, etc., as described above. In addition, for example, electrical component 1106, in an aspect, can include a UE registering component 214 or 222, as described.

Additionally, system 1100 can include a memory 1108 that retains instructions for executing functions associated with the electrical components 1104 and 1106. While shown as being external to memory 1108, it is to be understood that one or more of the electrical components 1104 and 1106 can exist within memory 1108. Moreover, for example, electrical components 1104 and 1106 can be interconnected by a bus 1112. In one example, electrical components 1104 and 1106 can include at least one processor, or each electrical component 1104 and 1106 can be a corresponding module of at least one processor. Moreover, in an additional or alternative example, electrical components 1104 and 1106 can be a computer program product comprising a computer readable medium, where each electrical component 1104 and 1106 can be corresponding code.

Figure 12:
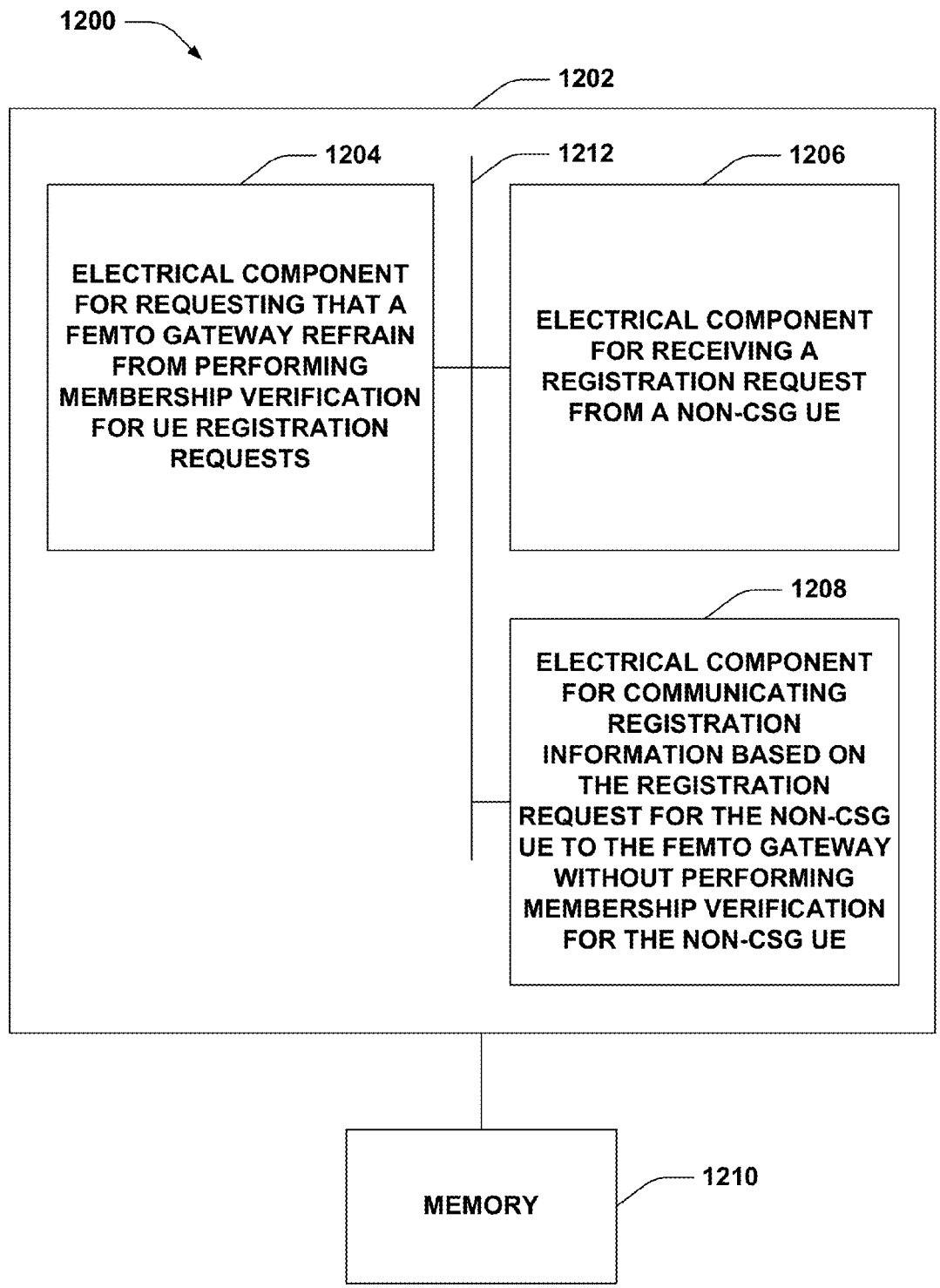
FIG. 12 is a block diagram of an aspect of a system that requests that a femto gateway refrain from performing membership verification for one or more UEs.

FIG. 12 illustrates a system 1200 for refraining from performing membership verification for one or more UEs. For example, system 1200 can reside at least partially within a femto node or other low power base station. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for requesting that a femto gateway refrain from performing membership verification for UE registration requests 1204. Logical grouping 1202 also includes an electrical component for receiving a registration request from a non-CSG UE 1206. Further, logical grouping 1202 can include an electrical component for communicating registration information based on the registration request for the non-CSG UE to the femto gateway without performing membership verification for the non-CSG UE 1208.

For example, electrical component 1204 can include a membership verification specifying component 216, as described. Moreover, electrical component 1206 can include a UE registration receiving component 212 or 220, etc., as described above. In addition, for example, electrical component 1208, in an aspect, can include a UE registering component 214 or 222, as described.

Additionally, system 1200 can include a memory 1210 that retains instructions for executing functions associated with the electrical components 1204, 1206, and 1208. While shown as being external to memory 1210, it is to be understood that one or more of the electrical components 1204, 1206, and 1208 can exist within memory 1210. Moreover, for example, electrical components 1204, 1206, and 1208 can be interconnected by a bus 1212. In one example, electrical components 1204, 1206, and 1208 can include at least one processor, or each electrical component 1204, 1206, and 1208 can be a corresponding module of at least one processor. Moreover, in an additional or alternative example, electrical components 1204, 1206, and 1208 can be a computer program product comprising a computer readable medium, where each electrical component 1204, 1206, and 1208 can be corresponding code.

Figure 13:
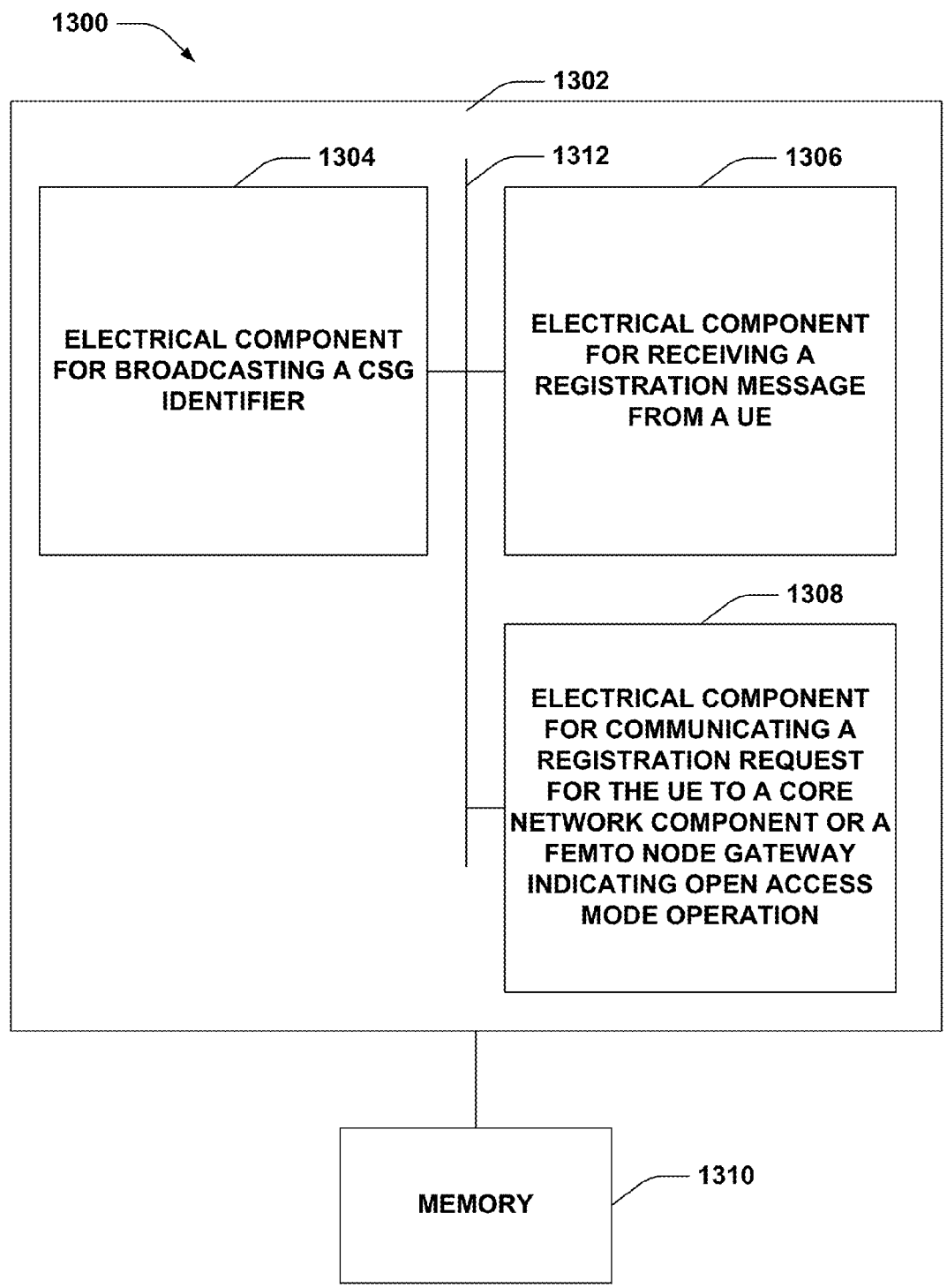
FIG. 13 is a block diagram of an aspect of a system that avoids membership verification for one or more UEs.

FIG. 13 illustrates a system 1300 for refraining from performing membership verification for one or more UEs. For example, system 1300 can reside at least partially within a femto node or other low power base station. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for broadcasting a CSG identifier 1304. Logical grouping 1302 also includes an electrical component for receiving a registration message from a UE 1306. Further, logical grouping 1302 can include an electrical component for communicating a registration request from the UE to a core network component or a femto node gateway indicating open access mode operation 1308.

For example, electrical component 1304 can include a CSG advertising component 210, as described. Moreover, electrical component 1306 can include a UE registration receiving component 212, as described above. In addition, for example, electrical component 1308, in an aspect, can include a UE registering component 214, as described.

Additionally, system 1300 can include a memory 1310 that retains instructions for executing functions associated with the electrical components 1304, 1306, and 1308. While shown as being external to memory 1310, it is to be understood that one or more of the electrical components 1304, 1306, and 1308 can exist within memory 1310. Moreover, for example, electrical components 1304, 1306, and 1308 can be interconnected by a bus 1312. In one example, electrical components 1304, 1306, and 1308 can include at least one processor, or each electrical component 1304, 1306, and 1308 can be a corresponding module of at least one processor. Moreover, in an additional or alternative example, electrical components 1304, 1306, and 1308 can be a computer program product comprising a computer readable medium, where each electrical component 1304, 1306, and 1308 can be corresponding code.

Figure 14:
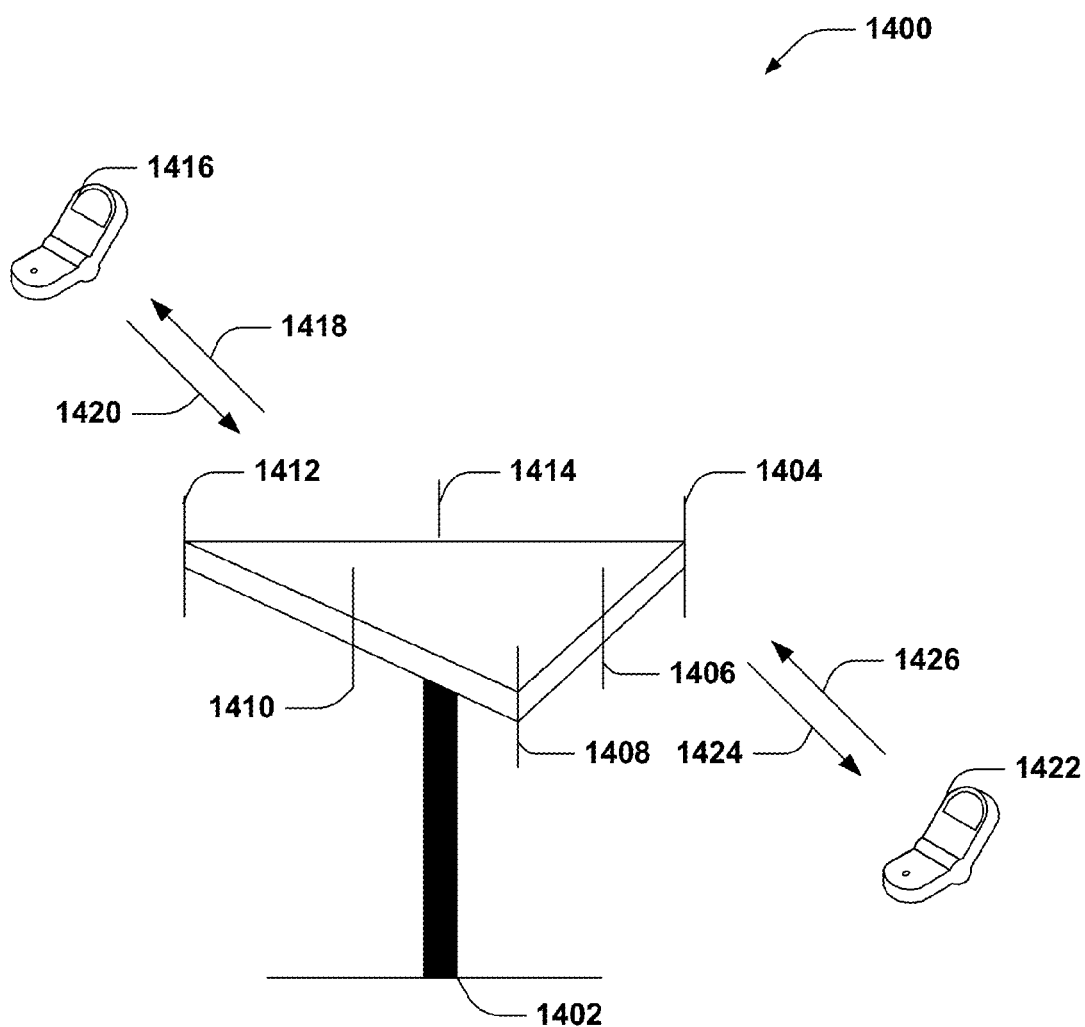
FIG. 14 is a block diagram of an aspect of a wireless communication system in accordance with various aspects set forth herein.

FIG. 14 illustrates a wireless communication system 1400 in accordance with various embodiments presented herein. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components or modules associated with signal transmission and reception (e.g., processors, modulators, multiplexers, demodulators, demultiplexers, antennas, etc.), as is appreciated.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage, mobile devices in neighboring cells can be subject to less interference as compared to a base station transmitting through a single antenna to all its mobile devices.

Moreover, mobile devices 1416 and 1422 can communicate directly with one another using a peer-to-peer or ad hoc technology as depicted.

Figure 15:
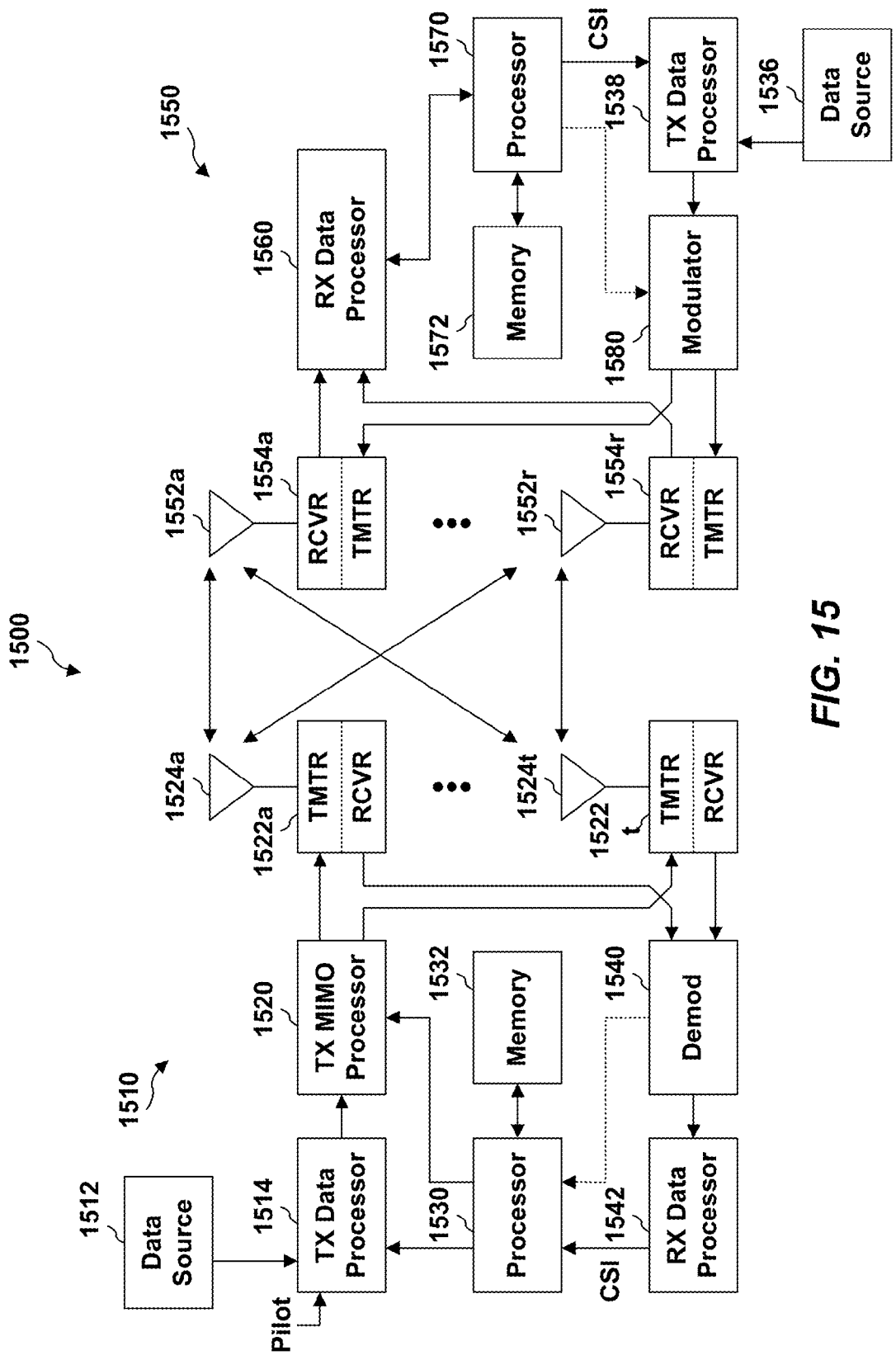
FIG. 15 is a schematic block diagram of an aspect of a wireless network environment that can be employed in conjunction with the various systems and methods described herein.

FIG. 15 shows an example wireless communication system 1500. The wireless communication system 1500 depicts one base station 1510 and one mobile device 1550 for sake of brevity. However, it is to be appreciated that system 1500 can include more than one base station and/or more than one mobile device, wherein additional base stations and/or mobile devices can be substantially similar or different from example base station 1510 and mobile device 1550 described below. Moreover, base station 1510 can be a low power base station, in one example, such as one or more femto nodes previously described. In addition, it is to be appreciated that base station 1510 and/or mobile device 1550 can employ the example systems (FIGS. 1-3 and 8-14) and/or methods (FIGS. 4-7) described herein to facilitate wireless communication there between. For example, components or functions of the systems and/or methods described herein can be part of a memory 1532 and/or 1572 or processors 1530 and/or 1570 described below, and/or can be executed by processors 1530 and/or 1570 to perform the disclosed functions.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At mobile device 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from mobile device 1550 are received by antennas 1524, conditioned by receivers 1522, demodulated by a demodulator 1540, and processed by a RX data processor 1542 to extract the reverse link message transmitted by mobile device 1550. Further, processor 1530 can process the extracted message to determine which precoding matrix to use for determining the beamforming weights.

Processors 1530 and 1570 can direct (e.g., control, coordinate, manage, etc.) operation at base station 1510 and mobile device 1550, respectively. Respective processors 1530 and 1570 can be associated with memory 1532 and 1572 that store program codes and data. For example, processor 1530 and/or 1570 can execute, and/or memory 1532 and/or 1572 can store instructions related to functions and/or components described herein, such as refraining from performing membership verification, requesting such, advertising restricted access for other purposes, and/or the like, as described.

Figure 16:
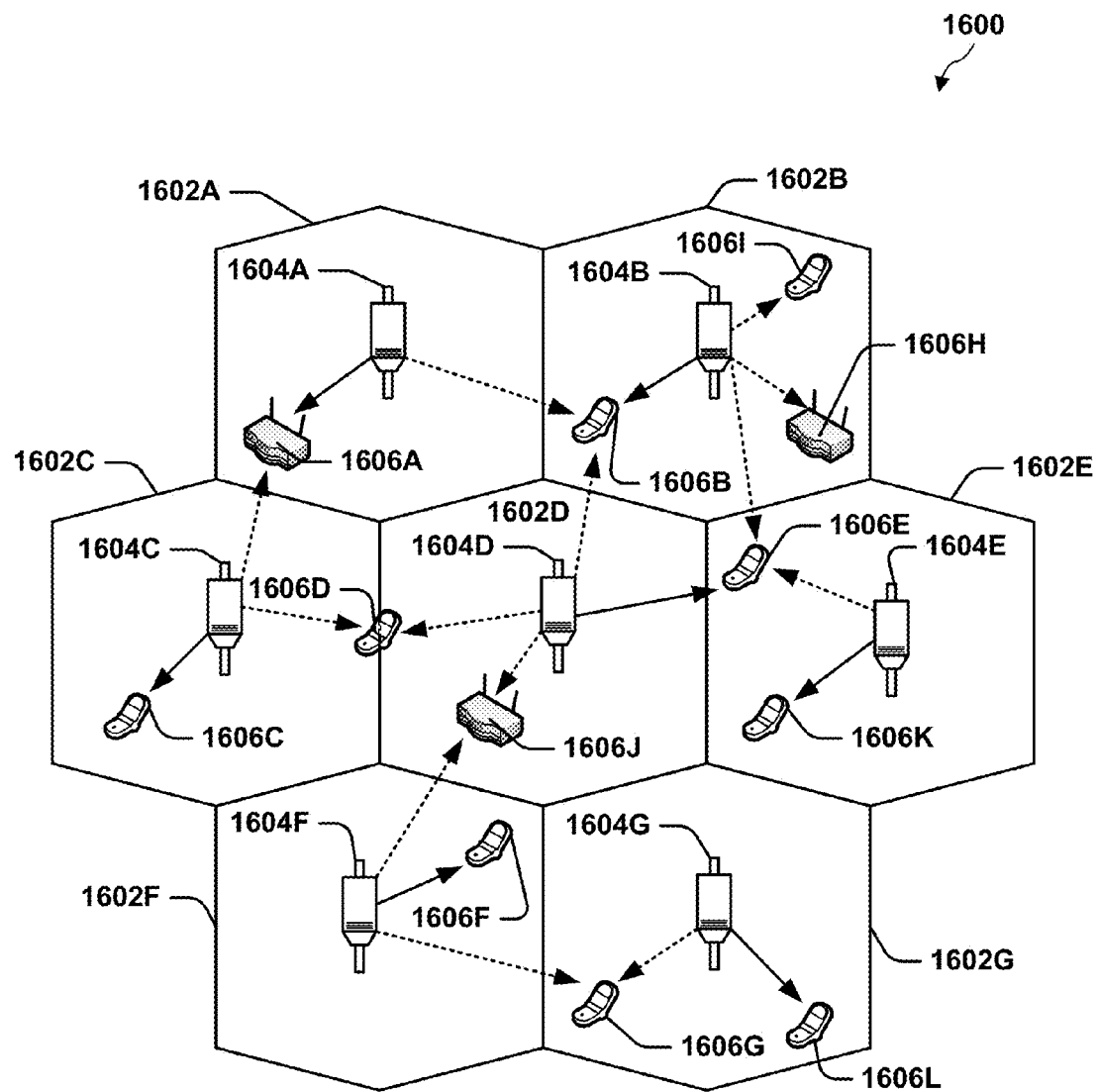
FIG. 16 illustrates an example wireless communication system, configured to support a number of devices, in which the aspects herein can be implemented.

FIG. 16 illustrates a wireless communication system 1600, configured to support a number of users, in which the teachings herein may be implemented. The system 1600 provides communication for multiple cells 1602, such as, for example, macro cells 1602A-1602G, with each cell being serviced by a corresponding access node 1604 (e.g., access nodes 1604A-1604G). As shown in FIG. 16, access terminals 1606 (e.g., access terminals 1606A-1606L) can be dispersed at various locations throughout the system over time. Each access terminal 1606 can communicate with one or more access nodes 1604 on a forward link (FL) and/or a reverse link (RL) at a given moment, depending upon whether the access terminal 1606 is active and whether it is in soft handoff, for example. The wireless communication system 1600 can provide service over a large geographic region.

Figure 17:
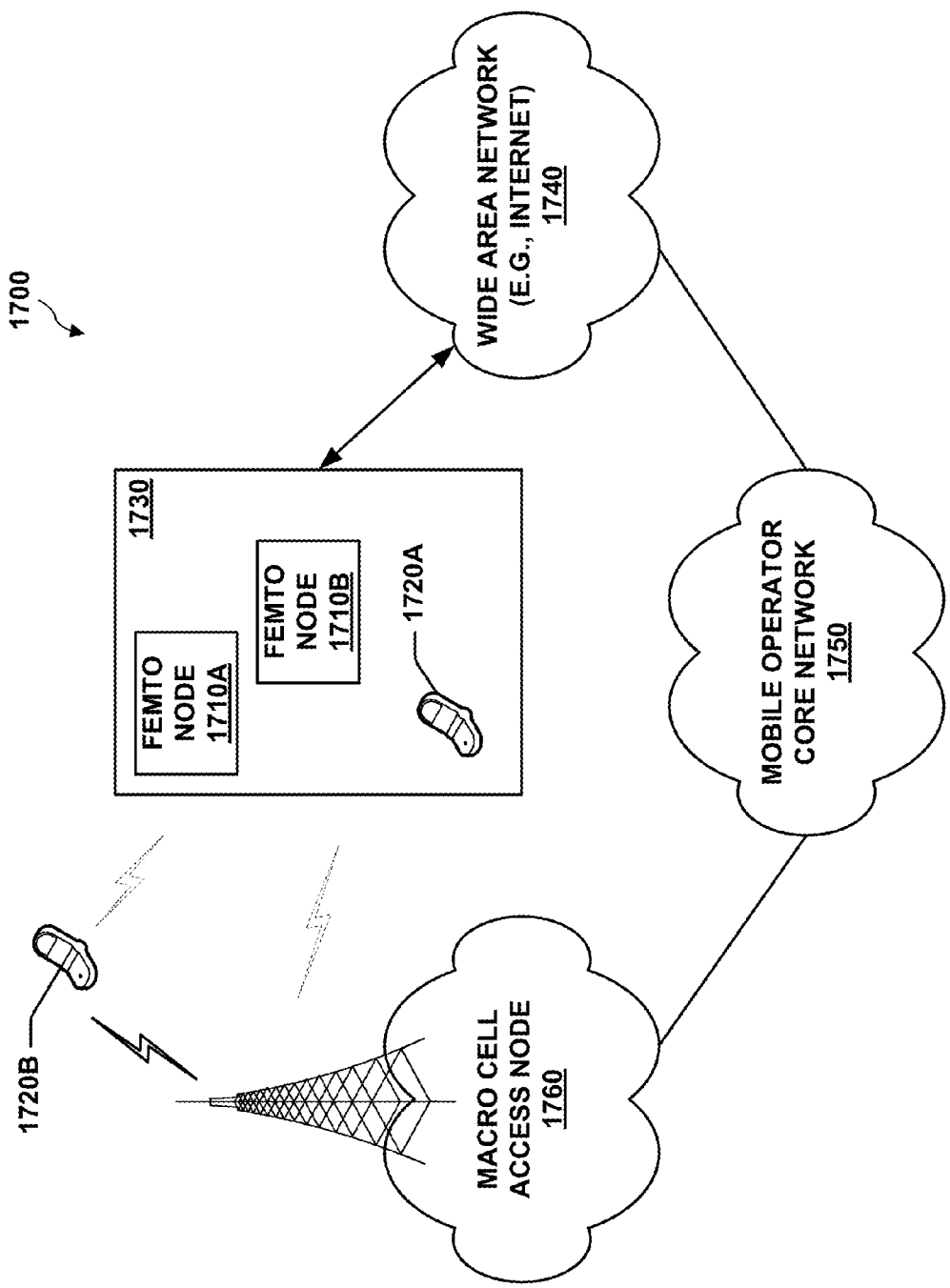
FIG. 17 is an illustration of an exemplary communication system to enable deployment of femtocells within a network environment.

FIG. 17 illustrates an exemplary communication system 1700 where one or more femto nodes are deployed within a network environment. Specifically, the system 1700 includes multiple femto nodes 1710A and 1710B (e.g., femtocell nodes or H(e)NB) installed in a relatively small scale network environment (e.g., in one or more user residences 1730). Each femto node 1710 can be coupled to a wide area network 1740 (e.g., the Internet) and a mobile operator core network 1750 via a digital subscriber line (DSL) router, a cable modem, a wireless link, or other connectivity means (not shown). As will be discussed below, each femto node 1710 can be configured to serve associated access terminals 1720 (e.g., access terminal 1720A) and, optionally, alien access terminals 1720 (e.g., access terminal 1720B). In other words, access to femto nodes 1710 can be restricted such that a given access terminal 1720 can be served by a set of designated (e.g., home) femto node(s) 1710 but may not be served by any non-designated femto nodes 1710 (e.g., a neighbor's femto node).

Figure 18:
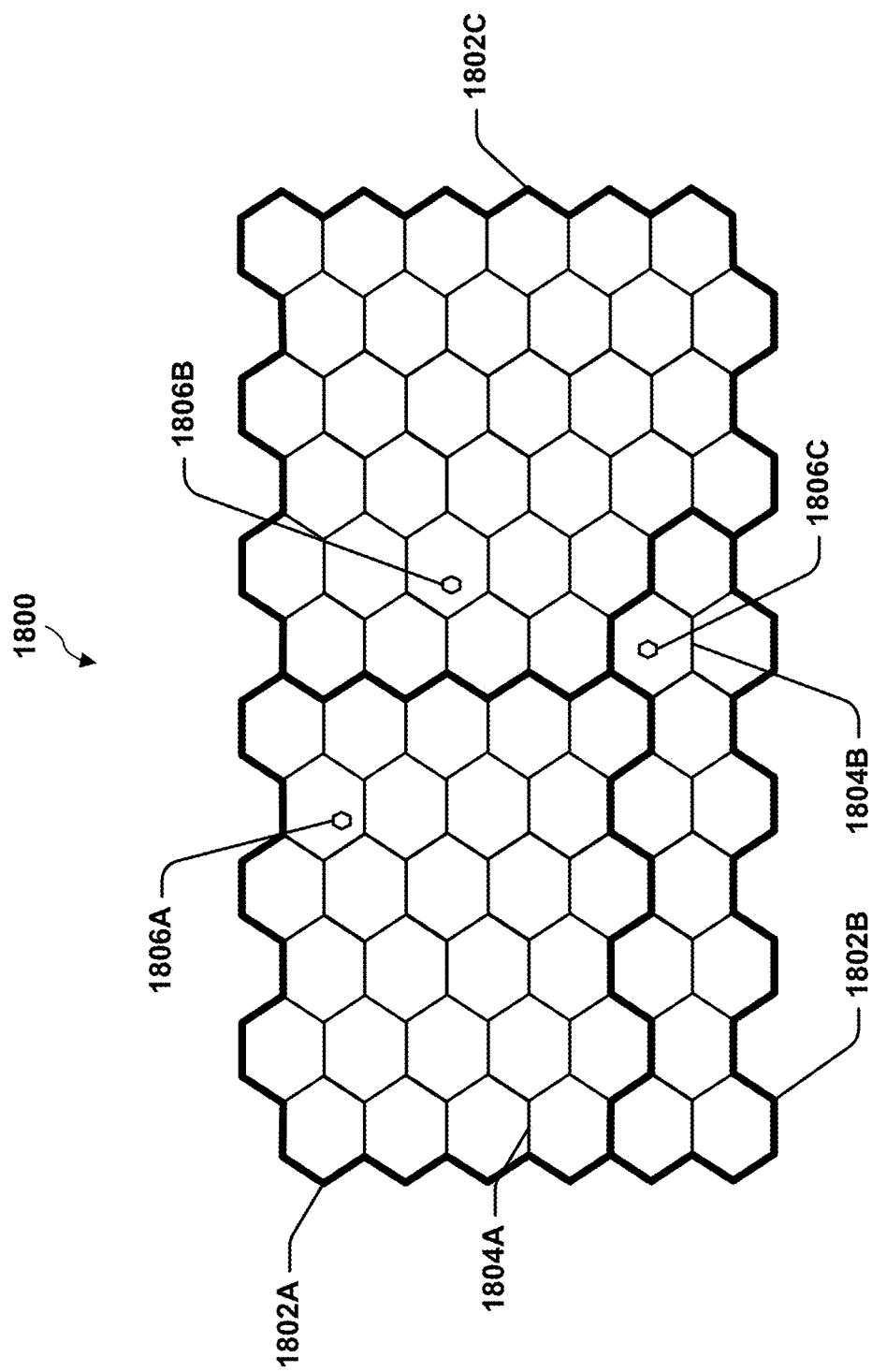
FIG. 18 illustrates an example of a coverage map having several defined tracking areas.

FIG. 18 illustrates an example of a coverage map 1800 where several tracking areas 1802 (or routing areas or location areas) are defined, each of which includes several macro coverage areas 1804. Here, areas of coverage associated with tracking areas 1802A, 1802B, and 1802C are delineated by the wide lines and the macro coverage areas 1804 are represented by the hexagons. The tracking areas 1802 also include femto coverage areas 1806. In this example, each of the femto coverage areas 1806 (e.g., femto coverage area 1806C) is depicted within a macro coverage area 1804 (e.g., macro coverage area 1804B). It should be appreciated, however, that a femto coverage area 1806 may not lie entirely within a macro coverage area 1804. In practice, a large number of femto coverage areas 1806 can be defined with a given tracking area 1802 or macro coverage area 1804. Also, one or more pico coverage areas (not shown) can be defined within a given tracking area 1802 or macro coverage area 1804.

Referring again to FIG. 17, the owner of a femto node 1710 can subscribe to mobile service, such as, for example, 3G mobile service, offered through the mobile operator core network 1750. In addition, an access terminal 1720 can be capable of operating both in macro environments and in smaller scale (e.g., residential) network environments. Thus, for example, depending on the current location of the access terminal 1720, the access terminal 1720 can be served by an access node 1760 or by any one of a set of femto nodes 1710 (e.g., the femto nodes 1710A and 1710B that reside within a corresponding user residence 1730). For example, when a subscriber is outside his home, he is served by a standard macro cell access node (e.g., node 1760) and when the subscriber is at home, he is served by a femto node (e.g., node 1710A). Here, it should be appreciated that a femto node 1710 can be backward compatible with existing access terminals 1720.

A femto node 1710 can be deployed on a single frequency or, in the alternative, on multiple frequencies. Depending on the particular configuration, the single frequency or one or more of the multiple frequencies can overlap with one or more frequencies used by a macro cell access node (e.g., node 1760). In some aspects, an access terminal 1720 can be configured to connect to a preferred femto node (e.g., the home femto node of the access terminal 1720) whenever such connectivity is possible. For example, whenever the access terminal 1720 is within the user's residence 1730, it can communicate with the home femto node 1710.

In some aspects, if the access terminal 1720 operates within the mobile operator core network 1750 but is not residing on its most preferred network (e.g., as defined in a preferred roaming list), the access terminal 1720 can continue to search for the most preferred network (e.g., femto node 1710) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1720 can limit the search for specific band and channel. For example, the search for the most preferred system can be repeated periodically. Upon discovery of a preferred femto node, such as femto node 1710, the access terminal 1720 selects the femto node 1710 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1710 that reside within the corresponding user residence 1730). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted access. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on (e.g., the access terminal is a non-member), except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for avoiding membership verification for a user equipment (UE), comprising:
    broadcasting, by an access point, a closed subscriber group (CSG) identifier indicating that the access point is operating in one of a hybrid access mode or a restricted access mode while the access point is operating in one of an open access mode in a core network or an open access mode with a femto node gateway;
    receiving a registration message from a UE; and
    communicating a registration request for the UE to a core network component of the core network or the femto node gateway indicating open access mode operation.

2. The method of claim 1, wherein the CSG identifier indicates at least one of a femto node cluster identifier, loading information, or primary scrambling code confusion.

3. An apparatus for avoiding membership verification for a user equipment (UE), comprising:
    at least one processor configured to:
        broadcast a closed subscriber group (CSG) identifier indicating that an access point is operating in one of a hybrid access mode or a restricted access mode while the access point is operating in one of an open access mode in a core network or an open access mode with a femto node gateway;
        receive a registration message from a UE; and
        communicate a registration request for the UE to a core network component of the core network or the femto node gateway indicating open access mode operation; and
    a memory coupled to the at least one processor.

4. An apparatus for avoiding membership verification for a user equipment (UE), comprising:
    means for broadcasting a closed subscriber group (CSG) identifier indicating that an access point is operating in one of a hybrid access mode or a restricted access mode while the access point is operating in one of an open access mode in a core network or an open access mode with a femto node gateway;
    means for receiving a registration message from a UE; and
    means for communicating a registration request for the UE to a core network component of the core network or the femto node gateway indicating open access mode operation.

5. A non-transitory computer-readable medium storing computer-executable code, comprising:
    code for causing at least one computer to broadcast a closed subscriber group (CSG) identifier indicating that an access point is operating in one of a hybrid access mode or a restricted access mode while the access point is operating in one of an open access mode in a core network or an open access mode with a femto node gateway;
    code for causing the at least one computer to receive a registration message from a user equipment (UE); and
    code for causing the at least one computer to communicate a registration request for the UE to a core network component of the core network or the femto node gateway indicating open access mode operation.

6. An apparatus for avoiding membership verification for a user equipment (UE), comprising:

a closed subscriber group (CSG) advertising component including hardware and configured to broadcast a CSG identifier indicating that an access point is operating in one of a hybrid access mode or a restricted access mode while the access point is operating in one of an open access mode in a core network or an open access mode with a femto node gateway;

a UE registration receiving component including hardware and configured to receive a registration message from a UE; and a UE registering component including hardware and configured to communicate a registration request for the UE to a core network component of the core network component or the femto node gateway indicating open access mode operation.

7. The apparatus of claim 6, wherein the CSG identifier indicates at least one of a femto node cluster identifier, loading information, or primary scrambling code confusion.

8. The method of claim 1, further comprising registering the UE as capable of restricted access or hybrid access functionality, wherein the UE is not capable of interpreting restricted access or hybrid access parameters.

9. The apparatus of claim 6, wherein the UE registering component includes hardware and is further configured to register the UE as capable of restricted access or hybrid access functionality, wherein the UE is not capable of interpreting restricted access or hybrid access parameters.

10. The method of claim 1, further comprising requesting that the femto gateway not perform membership verification for at least the UE during registration of the femto node with the core network or the femto gateway.

11. The method of claim 1, wherein communicating a registration request includes requesting that the femto gateway not perform membership verification for the UE during registration of the UE with the core network.

12. The method of claim 1, further comprising indicating to the core network or the femto gateway that the access point operates using an open access mode.

* * * * *